United States Patent
Arshad et al.

(10) Patent No.: US 10,667,290 B2
(45) Date of Patent: May 26, 2020

(54) METHOD FOR HANDLING USERS WITH DIFFERENT TIMING ALIGNMENT REQUIREMENTS

(71) Applicant: Telefonaktiebolaget LM Ericsson (publ), Stockholm (SE)

(72) Inventors: Malik Wahaj Arshad, Upplands Väsby (SE); Robert Karlsson, Sundbyberg (SE); Gustav Wikström, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/736,054

(22) PCT Filed: Nov. 29, 2017

(86) PCT No.: PCT/SE2017/051189
§ 371 (c)(1),
(2) Date: Dec. 13, 2017

(87) PCT Pub. No.: WO2018/101880
PCT Pub. Date: Jun. 7, 2018

(65) Prior Publication Data
US 2019/0007962 A1    Jan. 3, 2019

Related U.S. Application Data

(60) Provisional application No. 62/428,045, filed on Nov. 30, 2016.

(51) Int. Cl.
*H04W 72/04* (2009.01)
*H04W 72/14* (2009.01)
*H04W 56/00* (2009.01)

(52) U.S. Cl.
CPC ....... *H04W 72/14* (2013.01); *H04W 56/0045* (2013.01); *H04W 72/0446* (2013.01)

(58) Field of Classification Search
CPC .................... H04W 72/14; H04W 72/0446
See application file for complete search history.

(56) References Cited

U.S. PATENT DOCUMENTS

| | | | |
|---|---|---|---|
| 2016/0066316 A1* | 3/2016 | Bhushan | H04W 72/0446 370/329 |
| 2018/0124829 A1* | 5/2018 | Lee | H04L 5/00 |
| 2018/0227955 A1* | 8/2018 | Hosseini | H04W 52/367 |

FOREIGN PATENT DOCUMENTS

| WO | 2009/082310 A1 | 7/2009 |
|---|---|---|
| WO | 2016/175631 A1 | 11/2016 |

(Continued)

OTHER PUBLICATIONS

PCT International Search Report for International Application No. PCT/SE2017/051169, dated Feb. 19, 2016.

(Continued)

*Primary Examiner* — Lakeram Jangbahadur
(74) *Attorney, Agent, or Firm* — Baker Botts, LLP

(57) ABSTRACT

A method in a network node (115) comprises determining (404), for one or more wireless devices (110), whether one or more or a short transmission time interval (TTI) and a reduced processing time are supported by the one or more wireless devices. The method comprises assigning (405) the one or more wireless devices to one of at least two available scheduling pools (215, 220) based on the determination of whether one or more of the short TTI and the reduced processing time are supported.

18 Claims, 10 Drawing Sheets

(56) References Cited

FOREIGN PATENT DOCUMENTS

| WO | 2016/177176 A1 | 11/2016 |
| WO | 2017/078966 A1 | 5/2017 |
| WO | 2017/079127 A1 | 5/2017 |
| WO | 2017/155607 A1 | 9/2017 |

OTHER PUBLICATIONS

PCT Written Opinion of the International Searching Authority for International Application No. PCT/SE2017/051189—dated Feb. 19, 2018.
3GPP TSG-RAN WG4 190 81, Reno, Nevada, USA, Source: Ericsson, Title: UL power control issues related to shortened TTI patterns (R4-1610470), Agenda Item: 10.1.2, Document for: Discussion, Nov. 14-18, 2016, 4 pages.

\* cited by examiner

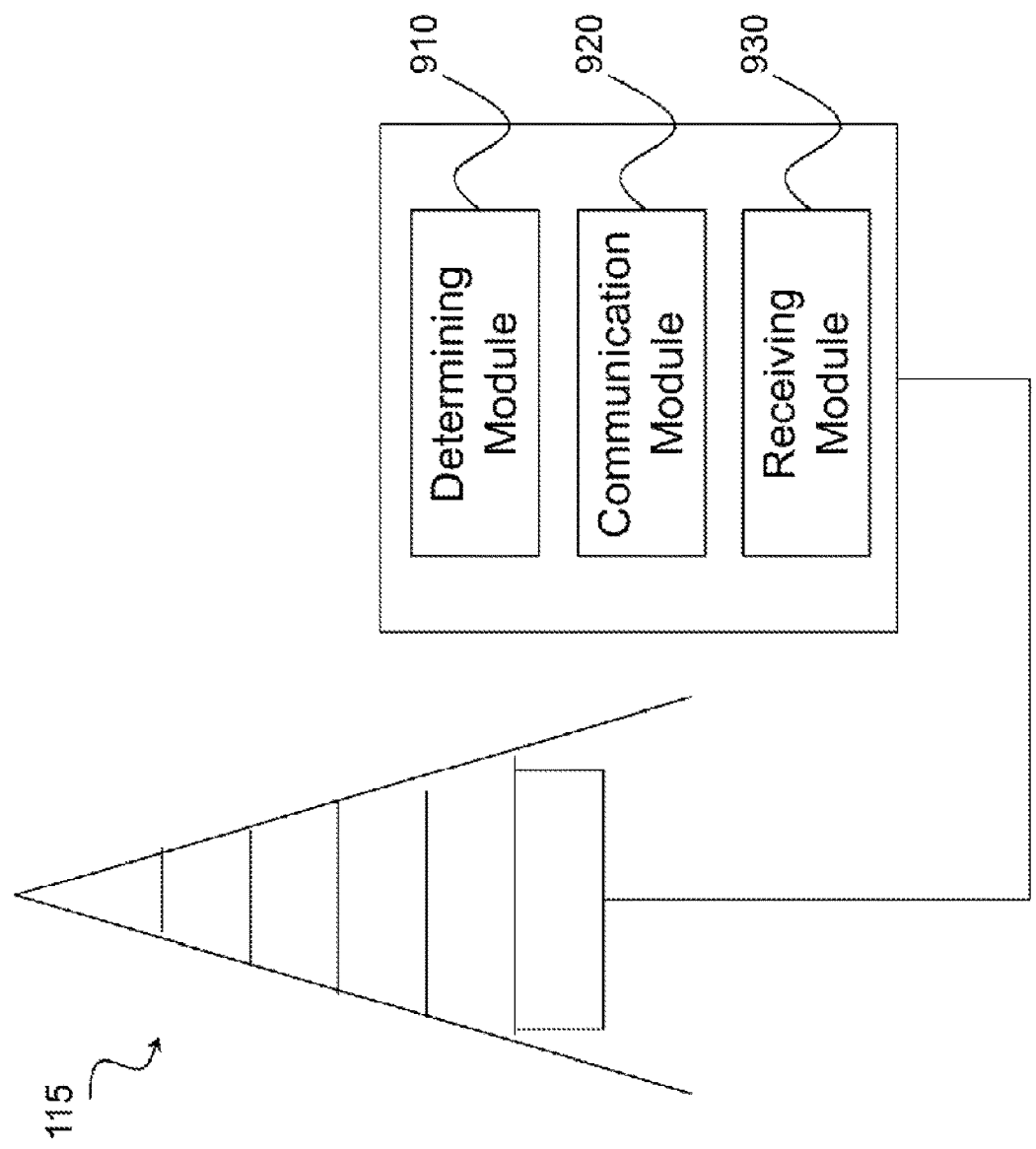

METHOD FOR HANDLING USERS WITH DIFFERENT TIMING ALIGNMENT REQUIREMENTS

PRIORITY

This nonprovisional application is a U.S. National Stage Filing under 35 U.S.C. § 371 of International Patent Application Serial No. PCT/SE2017/051189 filed Nov. 29, 2017, and entitled "Method For Handling Users With Different Timing Alignment Requirements" which claims priority to U.S. Provisional Patent Application No. 62/428,045 filed Nov. 30, 2016, both of which are hereby incorporated by reference in their entirety.

TECHNICAL FIELD

The present disclosure relates, in general to wireless communications and, more particularly, to a method for handling users with different timing alignment requirements.

BACKGROUND

In terms of network performance, packet data latency is one of the key metrics for operators, vendors and end users. Latency measurements are performed during all phases of a radio access network (RAN) lifespan. Long Term Evolution (LTE) bad been hailed to have better latency figures than other Radio Access Technologies (RATS) available now. A key differentiator for 5G from LTE would be latency figures.

Reduced latency ha always been a key building block of any new RAT. The benefits of reduced latency are immense, including increased system capacity and enhanced user experience. In some cases, reduced latency may also lead to a faster control plane signaling, implicitly supporting more dynamic control of the network to optimize the available network resources in the best possible manner.

Currently, LTE uplink (UL) ensures that the UL transmissions received from different wireless devices within a cell arrive at the eNodeB (eNB) at the same time, thus maintaining UL timing at the eNB and avoiding inter-subframe interference. If there are small timing misalignments between received signals, the cyclic prefix of the transmission can compensate for it. In LTE the mechanism to control the receive timing is called UL time alignment.

Timing advance is an offset at the wireless device between the start of a received downlink (DL) subframe and a transmitted UL subframe. The network controls the timing of the received signals from a wireless device by controlling this offset.

Timing advance is, ideally, directly proportional to propagation delay. A wireless device far from a base station experiences higher propagation delay, while wireless devices close to the base station experience less propagation delay. Thus, wireless devices at cell edge must start their transmission earlier than wireless devices at the cell center so that both transmissions arrive in-sync at the network receiver.

The network continuously monitors the UL transmission, estimating received signal propagation delay and, if required, instructs the wireless device to adjust its transmission timing using a timing advance command. Besides the normal UL sounding signal, the network can use any UL transmission to estimate the propagation delay.

The time alignment is performed starting from initial attach, then at regular or irregular intervals during the wireless device's stay in a cell (as well as in a target cell after handover). At initial access, the wireless device sends a random access preamble. The network measures the timing offset of the preamble, and sends a timing offset back in the random access response with a timing advance Medium Access Control (MAC) Control Element (CE). The wireless device then adjusts its timing per the timing offset in the random access response before transmitting in the UL.

The network also continuously monitors the UL timing or the wireless device, and determines whether the timing offset is within a targeted range (compared to the ideal timing). The network transmits a Timing Advance Command to the wireless device when the timing offset is outside the targeted range. The network might periodically send Timing Advance Commands to the wireless device even if no change of timing offset has taken place. If the wireless device timing alignment timer expires, the wireless device has to do a random access to restore the timing.

During handover, the wireless device receives a RRC Connection Reconfiguration message from the source network commanding the wireless device to perform the handover. After receiving the RRC Connection Reconfiguration message, the wireless device performs synchronization to a target network and accesses the target cell via a random access preamble on the Random Access Channel (RACH). The target network measures the timing offset of the preamble, and responds with an UL allocation and with a timing advance MAC CE. The wireless device then adjusts its timing per the timing offset value before transmitting RRC Connection Reconfiguration Complete message to indicate that the handover procedure is completed for the terminal.

SUMMARY

To address problems with existing approaches, disclosed is a method in a network node. The method comprises determining, for one or more wireless devices, whether one or more of a short transmission time interval (TTI) and a reduced processing time are supported by the one or more wireless devices. The method comprises assigning the one or more wireless devices to one of at least two available scheduling pools based on the determination of whether one or more of the short TTI and the reduced processing time are supported.

In certain embodiments, assigning the one or more wireless devices to one of at least two available scheduling pools based on the determination of whether one or more of the short TTI and the reduced precessing time are supported may comprise assigning one or more wireless devices determined to support one or more of the short TTI and the reduced processing time to a first scheduling pool, and assigning one or more wireless devices determined not to support one or more of the short TTI and the reduced processing time to a second scheduling pool.

In certain embodiments, the method may comprise scheduling the one or more wireless devices based on the assigned scheduling pool. Scheduling the one or more wireless devices based on the assigned scheduling pool may comprise scheduling the one or more wireless devices assigned to the first scheduling pool with one or more of a short TTI and reduced processing time, and scheduling the one or more wireless devices assigned to the second scheduling pool with a legacy grant.

In certain embodiments, the method may comprise determining whether a timing advance value of the one or more wireless devices is below one or more threshold values. Assigning the one or more wireless devices to one of the at least two available scheduling pools may be further based on the determination of whether the timing advance value of the one or more wireless devices is below the one or more threshold values.

In certain embodiments, the method may comprise moving a first wireless device assigned to the first scheduling pool to the second scheduling pool based en one or more criteria, wherein the first wireless device assigned to the first scheduling pool has a timing advance value that is below the one or more threshold values. In certain embodiments, the one or more criteria may comprise the timing advance value of the first wireless device. The method may comprise determining whether the timing advance value of the first wireless device has increased above a maximum allowed timing advance value for one or more of the short and the reduced processing time, and upon determining that the timing advance value of the first wireless device has increased above the maximum allowed timing advance value for one or more of the short TTI and the reduced processing time, moving the first wireless device assigned to the first scheduling pool to the second scheduling pool.

In certain embodiments, the one or more criteria may comprise a deployment of the network node. The method may comprise determining a deployment of the network node, and determining whether this deployment of the network node is compatible with reduced maximum timing advance operation. The method may comprise upon determining that the deployment of the network node is not compatible with reduced maximum timing advance operation, moving the first wireless device assigned to the first scheduling pool to the second scheduling pool. In certain embodiments, determining whether the deployment of the network node is compatible with reduced maximum timing advance operation may comprise determining, based on a propagation delay induced by the deployment of the network node, whether the deployment of the network node is compatible with reduced maximum timing advance operation.

In certain embodiments, moving the first wireless device assigned to the first scheduling pool to the second scheduling pool based on one or more criteria may comprise at least one of: moving the first wireless device assigned to the first scheduling pool to the second scheduling pool if the first wireless device has non-stringent latency requirements; moving the first wireless device assigned to the first scheduling pool to the second scheduling pool if the first wireless device has a grant size requirement that is above a first threshold; moving the first wireless device assigned to the first scheduling pool to the second scheduling pool if the first wireless device has a probability of being scheduled in the first scheduling pool that is below a second threshold; and moving the first wireless device assigned to the first scheduling pool to the second scheduling pool if the deployment of the network node is not compatible with reduced timing advance operation.

In certain embodiments, the method may comprise moving the first wireless device from the second scheduling pod back to the first scheduling pool based on a change in network conditions. The change in network conditions may comprise at least one of: a decrease in a number of wireless devices in the first scheduling pool that can be scheduled with one or more of short TTI and reduced processing time; a decrease in an amount of data in a buffer of one or more wireless devices in the first scheduling pool; the grant size requirement of the first wireless device decreases below the first threshold; the probability of the first wireless device being scheduled in the first scheduling pool increases above the second threshold; and the timing advance value of the first wireless device decreases below the one or more threshold values.

In certain embodiments, the one or more criteria rutty comprise one or more of: the timing advance value of the first wireless device; a quality of service requirement of the first wireless device; a grant site requirement of the first wireless device; a probability that the first wireless device in the first scheduling pool will be scheduled; and a deployment of the network node. In certain embodiments, the method may comprise determining one or more of: a timing advance value of the one or more wireless devices; a quality of service requirement of the one or more wireless devices; a grant site requirement or the one or more wireless devices; a probability that the one or more wireless devices will be scheduled; and a deployment of the network node.

In certain embodiments, the method may comprise obtaining capability information for the one or more wireless devices, the capability information indicating whether the one or more wireless devices support one or more of the short TTI and the reduced processing time. The determination of whether the one or more wireless devices support one or more of a short TTI and a reduced processing time may be based on the obtained capability information.

Also disclosed is a network node. The network node comprises processing circuitry. The processing circuitry is configured to determine, for one or more wireless devices, whether one or more of a short transmission time interval (TTI) and a reduced processing time are supported by the one or more wireless devices. The processing circuitry is configured to assign the one or more wireless devices to one of at least two available scheduling pools based on the determination of whether one or more of the short TTI and the reduced processing time are supported.

Also disclosed is a network node. The network node comprises a determining module. The determining module is configured to determine, for one or more wireless devices, whether one or more of a short transmission time interval (TTI) and a reduced processing time are supported by the one or more wireless devices. The determining module is configured to assign the one or more wireless devices to one of at least two available scheduling pools based on the determination or whether one or more of the short TTI and the reduced processing time are supported.

Certain embodiments of the present disclosure may provide one or more technical advantages. For example, certain embodiments may advantageously handle wireless devices with different values for the maximum timing advance to reduce latency while taking quality of service (QoS) requirements into account. As another example, certain embodiments may advantageously move wireless devices between pools based on scheduling opportunities and/or wireless device conditions. As still another example, in certain embodiments wireless devices requiring large grants can be scheduled with normal TTI, which may advantageously save extra control overhead to transmit the same data with a large number of short TTI grants. As yet another example, in certain embodiments the most suitable wireless devices are scheduled with short TTI and reduced processing time features, which may advantageously maintain good resource utilization and low latency. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 9 is a block schematic of an exemplar network node, in accordance with certain embodiments.

DETAILED DESCRIPTION

Figure 1:
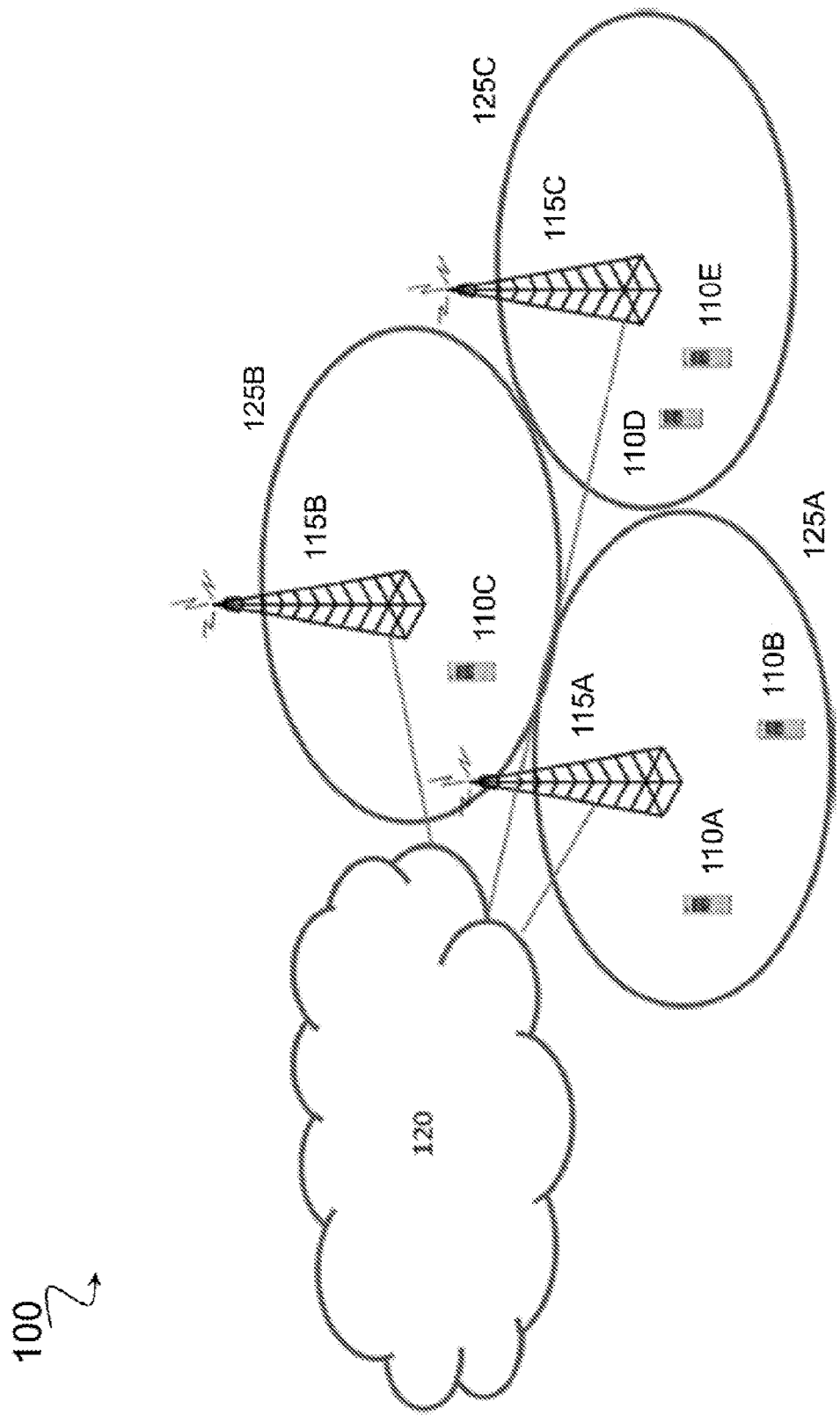
FIG. 1 is a block diagram illustrating an embodiment of a network, in accordance with certain embodiments.

Currently, LTE supports a maximum timing advance value of 0.67 ms, corresponding to mote than 100 km cell size. With respect to the Release 14 features of short transmission time interval (TTI) and reduced processing time, it has been discussed that the maximum value of timing advance for users supporting short TTI and/or reduced processing time would be lower. This leads to multiple values of maximum time alignment if a wireless device is configured with normal TTI, short TTI or with reduced processing. Existing approaches are not designed to take this new functionality into account.

The present disclosure contemplates various embodiments that may address these and other deficiencies associated with existing approaches. Certain embodiments, for example, may advantageously utilize the new definitions of maximum time alignment values (based on TTI size and reduced processing time) to reduce latency. In some cases, this is achieved by wireless device handling based on maximum timing advance values. Wireless devices can be scheduled with short TTI and reduced processing time if they meet the new maximum timing advance value. If they exceed the value, they are moved to a normal TTI wireless device scheduling pool. The wireless devices to be scheduled with short TTI and reduced processing time may be further limited based on uric or more criteria. For example, in certain embodiments wireless devices may be handled based on QoS requirements. In such a case, wireless devices with non-stringent QoS requirements can be moved to the normal TTI pool so the short TTI resources can be utilized for wireless devices with stringent QoS requirements. In certain embodiments, wireless devices can be moved between the short TTI pool and the legacy terminal pool based on the network resource situation and wireless device support for short TTI, thereby maintaining good resource utilization and low latency at all times. In certain embodiments, wireless devices requiring big grants can be scheduled with normal TTI, thus saving extra control overhead to transmit the same data with a large number of short TTI grants. In certain embodiments, deployment scenarios of network nodes may be taken into account, including handling of delay induced due to remote radio heads (RRHs) and adapting the scheduling accordingly.

According to one example embodiment, a method in a network node is disclosed. The network node determines, for one or more wireless devices, whether one or more of a short TTI and a reduced processing time are supported by the one or more wireless devices. The network node assigns the one or more wireless devices to one of at least two available scheduling pools based on the determination of whether one or more of the short TTI and the reduced processing time are supported. In certain embodiments, the network node assigns one or more wireless devices determined to support one or more of the short TTI and the reduced processing time to a first scheduling pool, and assigns one or more wireless devices determined not to support one or more of the short TTI and the reduced processing time to a second scheduling pool. In certain embodiments, the network node may determine whether a timing advance value of the one or more wireless devices is below one or more threshold values, and assign the one or more wireless devices to one or more of the at least two available scheduling pools further based on the determination of whether the timing advance value of the one or more wireless devices is below the one or more threshold values.

In certain embodiments, the network node schedules the one or more wireless devices based on the assigned scheduling pool. The network node may schedule the one or more wireless devices assigned to the first scheduling pool with one or inure of a short TTI and reduced processing time. The network node may schedule the one or more wireless devices assigned to the second scheduling pool with a legacy grant.

Certain embodiments of the present disclosure may provide one or more technical advantages. For example, certain embodiments may advantageously handle wireless devices with different values for the maximum timing advance to reduce latency while taking QoS requirements into account. As another example, certain embodiments may advantageously move wireless devices between legacy and short TTIs (or reduced processing time) pools based on scheduling opportunities as well as wireless device conditions. As still another example, in certain embodiments the wireless devices requiring large grants can be scheduled with normal TTI, which may advantageously save extra control overhead to transmit the same data with a large number of short TTI grants. As yet another example, in certain embodiments the most suitable wireless devices are scheduled with short TTI and reduced processing time features, which may advantageously maintain good resource utilization and low latency at all times. Other advantages may be readily apparent to one having skill in the art. Certain embodiments may have none, some, or all of the recited advantages.

FIG. 1 is a block diagram illustrating an embodiment of a network 100, in accordance with certain embodiments. Network 100 includes one or more wireless devices 110 (e.g., a UE) and one or more network node(s) 115 (e.g., an eNB). Wireless devices 110 may communicate with network nodes 115 over a wireless interface. For example, a wireless device 110 may transmit wireless signals to one or more of network nodes 115, and/or receive wireless signals from one or more of network nodes 115. The wireless signals may contain voice traffic, data traffic, control signals, and/or any other suitable information. In some embodiments, an area or wireless signal coverage associated with a network node 115 may be referred to as a cell 125. In some embodiments, wireless devices 110 may have device-to-device (D2D) capability. Thus, wireless devices 110 may be able to receive signals from and/or transmit signals directly to another wireless device.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable or transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term wireless device is used. Wireless devices 110 described herein can be any type of wireless device capable, configured, arranged and/or operable to communicate wirelessly with network nodes 115 and/or another wireless device. Communicating wirelessly may involve transmitting and/or receiving wireless signals using electromagnetic signals, radio waves, infrared signals, and/or other types of signals suitable for conveying information through air. In particular embodiments, wireless devices 110 may be configured to transmit and/or receive information without direct human interaction. For instance, a wireless device 110 may be designed to transmit information to a network on a predetermined schedule, when triggered by an internal or external event, or in response to requests from the network. Generally, a wireless device 110 may represent any device capable of, configured for, arranged for, and/or operable for wireless communication, for example radio communication devices. Examples of wireless devices 110 include, but are not limited to, UEs such as smart phones. Further examples include wireless cameras, wireless-enabled tablet computers, mobile terminals, laptop-embedded equipment (LEE), laptop-mounted equipment (LME), USB dongles, and/or wireless customer-premises equipment (CPE). Wireless device 110 may also be a radio communication device, target device, D2D) UE, a machine-type-communication (MTC) UE or UE capable of machine-to-machine (M2M) communication, low-cost and/or low-complexity UE, a sensor equipped with UE, or any other suitable devices. Wireless devices 110 may operate under either normal coverage or enhanced coverage with respect to its serving cell. The enhanced coverage may be interchangeably referred to as extended coverage. UE 110 max also operate in a plurality of coverage levels (e.g., normal coverage, enhanced coverage level 1, enhanced coverage level 2, enhanced coverage level 3 and so on). In some cases. UE 110 may also operate in out-of-coverage scenarios.

As one specific example, wireless device 110 may represent a UE configured for communication in accordance with one or more communication standards promulgated by 3GPP, such as 3GPP's GSM, UMTS, LTE, and/or 5G standards. As used herein, a "UE" may not necessarily have a "user" in the sense of a human use who owns and/or operates the relevant device. Instead, a UE may represent a device that is intended for sale to, or operation by, a human user but that may not initially be associated with a specific human user.

Wireless devices 110 may support D2D communication, for example by implementing a 3GPP standard for sidelink communication, and may in this case be referred to as D3D communication device.

As yet another specific example, in an Internet of Things (IOT) scenario, a wireless device 110 may represent a machine or other device that performs monitoring and/or measurements, and transmits the results of such monitoring and/or measurements to another wireless device and for a network node. The wireless device may in this case be a M2M device, which may in a 3GPP context be referred to as a MTC device. As one particular example, a wireless device 110 may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, personal wearables such as watches, etc.). In other scenarios, a wireless device 110 may represent a vehicle or other equipment that is capable of monitoring and/or reporting on its operational status or other functions associated with its operation.

Wireless device 110 as described above may represent the endpoint of a wireless connection, in which case the device may be referred to as a wireless terminal. Furthermore, a wireless device 110 as described above may be mobile, in which case it may also be referred to as a mobile device or a mobile terminal.

Also, in some embodiments generic terminology, "network node" is used. As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio APs. A network node may represent base stations (BSs), such as radio base stations. Particular examples of radio base stations include Node Bs, evolved Node Bs (eNBs), and gNBs. Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs, etc.), Operation and Maintenance (O&M) nodes, Operations Support System (OSS) nodes, Self-Organizing Network (SON) nodes, positioning nodes (e.g., Evolved Serving Mobile Location Center (E-SMLCs)), minimization of drive tests (MDTs), or any other suitable network node. More, generally, however, network nodes may represent any suitable device (or group of devices) capable, configured, arranged, and/or operable to enable and/or provide a wireless device access to the wireless communication network or to provide some service to a wireless device that has accessed the wireless communication network.

The terminology such as network node and wireless device should be considered non-limiting and does in particular not imply a certain hierarchical relation between the two; in general "network node" could be considered as device 1 and "wireless device" device 2, and these two devices communicate with each other, for example over some radio channel.

Example embodiments of wireless device 110, network nodes 115, and other network nodes (such as radio network controller or core network node) are described in more detail below with respect to FIGS. 5-9.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in an LTE network, the embodiments may be implemented in any appropriate type of telecommunication system supporting any suitable communication standards (including 5G standards) and using any suitable components, and are applicable to any radio access technology (RAT) or multi-RAT systems in which a wireless device receives and/or transmits signals (e.g., data). For example, the various embodiments described herein may be applicable to LTE, LTE-Advanced, LTE in Unlicensed Spectrum (LTE-U), MultiFire, NR, 5G, IoT, NB-IoT, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the DL, the present disclosure contemplates that the various embodiments are equally applicable in the UL and sidelink.

The various embodiments described herein may advantageously enhance the overall latency of network 100 by handling users (i.e., wireless devices 110) with different time alignment requirements as well as considering network resources available for short TTI scheduling.

As described above, in normal LTE scheduling there is a single maximum value of timing advance. The network can only handle a wireless device with a maximum timing advance value of approximately 0.67 ms, as shown in Table 1 below. The Release 14 features of reduced processing time and short TTI lengths introduce a new maximum value of timing advance for wireless devices that would be configured with those respective features. The maximum timing advance values for reduced processing time and short TTI are shown in Table 1 below. As can be seen from Table 1, these maximum values of timing advance are significantly lower than the normal TTI scheduling.

TABLE 1

Maximum Timing Advance Values

| TTI Structure | Max Timing Advance Value |
|---|---|
| Normal TTI | 0.67 ms |
| Reduced Processing Time | 0.2 ms |
| Short TTI 7-OS sTTI | 0.31 ms |
| Short TTI - 2/3-OS sTTI | 0.067 ms or 0.167 ms |

During normal operation, a network node (e.g., network node 115A) maintains a pool of users (e.g., wireless devices 110A and 110B) that would be scheduled with resources. Each wireless device 110 has its own scheduling requirements associated with it, including one or more of: feature support; grant size requirement; quality of service requirements; and channel conditions. In certain embodiments, a network node 115, e.g., network node 115A, segregates wireless devices 110 based on their support for short TTI and reduced processing time and schedules them accordingly. In certain embodiments, wireless devices 110 may be further divided based on one or more criteria, as described in more detail below. For example, wireless devices 110 may be further divided based on the condition that they meet their maximum time alignment value for short TTI or reduced processing time. As another example, wireless devices 110 can be further divided based on scheduling opportunities for short TTI or reduced processing time, QoS and grant sire requirements (e.g., large buffer wireless devices have lower overhead and latency if they are scheduled with normal TTIs), as well as handover to cells with RRHs with long cable delays (affecting the total transmission time). In this way, the most suitable wireless devices 110 are scheduled with short TTI or reduced processing time, which leads to overall latency reduction as well as better usage of resources in network 100.

For example, in certain embodiments a network node 115, e.g., network node 115A, determines, for one or more wireless devices 110 (e.g., wireless devices 110A and 110B) whether one or more of a short and a reduced processing time are supported. In certain embodiments, network node 115A may obtain capability information for wireless devices 110A and 110B. The capability information may indicate whether wireless devices 110A and 110B support one or more of the short TTI and the reduced processing time. In such a scenario, the determination of whether wireless devices 110A and 110B support one or more of the short TTI and the reduced processing time may be based on the obtained capability information.

Network node 115A assigns wireless devices 110A and 110B to one of at least two available scheduling pools based on the determination of whether one or more of the short TTI and the reduced processing lime are supported. For example, network node 115A may determine that wireless device 110A supports one or more of the short TTI and the reduced processing time. In such a scenario, network node 115A may assign wireless device 110A to a first scheduling pool based on the determination that wireless device 110A supports one or more of the short TTI and the reduced processing time. As another example, network node 115A may determine that wireless device 110B does not support one or more of the short TTI and the reduced processing time. In such a scenario, network node 115A may assign wireless device 110B to a second scheduling pool based on the determination that wireless device 110B does not support one or more of the short TTI and the reduced processing time.

In certain embodiments, network node 115A may determine whether a timing advance value for wireless devices 110A and 110B is below one or more threshold values. The one or more threshold values used may be based on whether wireless devices 110A and 110B support short TTI, reduced processing time, or both. For example, if wireless device 110A supports short TTI but not reduced processing time, network node 115A may determine whether the timing advance value of wireless device 110A is below a maximum timing advance value for short TTI. If wireless device 110A supports reduced processing time but not short TTI, network node 115A may determine whether the timing advance value of wireless device 110A is below a maximum timing advance value for reduced processing time. If wireless device 110A supports short TTI and reduced processing time, network node 115A may determine whether the timing advance value of wireless device 110A is below the maximum dining advance value for short TTI and the maximum timing advance value for reduced processing time. The appropriate one or more threshold values used for wireless device 110B may be determined using a similar approach.

In certain embodiments, network node 115A may assign wireless devices 110A and 110B to one of the at least two available scheduling pools further based on the determination of whether the timing advance values for wireless devices 110A and 110B are below the one or more threshold values. As described above, network node 115A may determine that wireless device 110A supports one or more of a short TTI and a reduced processing time. In some cases, if network node 115A also determines that a timing advance value of wireless device 110A is below the one or more threshold values, network node 115A may take that into account when assigning wireless device 110A to one of the at least two available scheduling pools. For example, if network node 115A determines that the timing advance value of wireless device 110A is below the one or more threshold values, network node 115A may assign wireless device 110A to the first scheduling pool. In some cases, however, if network node 115A determines that the timing advance value of wireless device 110A is not below the one or more threshold values, network node 115A may assign wireless device 110A to the second scheduling pool (even though network node 115A determined that wireless device 110A supports one or more of the short TTI and the reduced processing time).

Although certain embodiments may be described using examples involving two scheduling pools, the present disclosure is not limited to such examples. Rather, the present disclosure contemplates that the various embodiments described herein may be applied in situations where more than two scheduling pools are used.

Network node 115A schedules wireless devices 110A and 110B based on their assigned scheduling pool. To illustrate, assume that wireless device 110A supports one or more of the short TTI and reduced processing time, and that wireless device 110B does not support one or more of the short TTI and reduced processing time. Assume further that network node 115A has assigned wireless device 110A to the first scheduling pool based on its support for one or more of the short TTI and reduced processing time, and that network node 115A has assigned wireless device 110B to the second scheduling pool based on wireless device 110B lacking support for one or more of the short TTI and reduced processing time. In such a scenario, network node 115A will schedule wireless device 110A with one or more of a short TTI and reduced processing time because it has been assigned to the first scheduling pool. Network node 115A will schedule wireless device 110B with a legacy grant, however, because it has been assigned to the second scheduling pool.

Network node 115A may perform the above described process for each wireless device 110 in the pool of users for which network node 115A schedules resources. For example, network node 115A may perform the above described process for any additional wireless devices in cell 125A associated with network node 115A.

In some cases, network node 115A may be able to further optimize the scheduling of resources for short TTI and reduced processing time by allocating or reallocating wireless devices 110 among the various scheduling pools (e.g., the first scheduling pool and the second scheduling pool). Assume, for example, that network node 115A assigned wireless device 110A to the first scheduling pool. As described above, network node 115A may have assigned wireless device 110A to the first scheduling pool because wireless device 110A supports one or more of short TTI and reduced processing time, and wireless device 110A had a timing advance value below one or more threshold values (e.g., a maximum timing advance value for short TTI and/or a maximum timing advance value for reduced processing time). In certain embodiments, network node 115A may move wireless device 110A from the first scheduling pool to the second scheduling pool to anther optimize the use of resources for short TTI and reduced processing time in network 100.

Network node 115A may move wireless device 110A from the first scheduling pool to the second scheduling pool based on any suitable criteria. As one example, in certain embodiments network node 115A may move wireless device 110A from the first scheduling pool to the second scheduling pool based on a change in the timing advance valine of wireless device 110A. Network node 115A may determine the timing advance value of wireless device 110A before it initially assigns wireless device 110A to the first scheduling pool. As described above, the timing advance value of wireless device 110A may change, for example based on the position of wireless device 110A in cell 125A. Thus, network node 115A may determine (e.g., periodically) whether the timing advance value of wireless device 110A has changed. In some cases, the timing advance value of wireless device 110A may increase. Network node 115A may determine whether the timing advance value of wireless device 110A has increased above the one or more threshold values (e.g., a maximum allowed timing advance value for one or more or the short TTI and the reduced processing time). Upon determining that the timing advance value of wireless device 110A has increased above the maximum allowed timing advance value for one or more of the short TTI and the reduced processing time, network node 115A may move wireless device 110A (which was previously assigned to the first scheduling pool) from the first scheduling pool to the second scheduling pool.

Criteria other than (or in addition to) the timing advance value may be used by network node 115A to further distribute wireless devices 110 among the various scheduling pools. As another example, network node 115A may consider a deployment of network node 115A. In such a scenario, network node 115A may determine a deployment of network node 115A, and determine whether the deployment of network node 115A is compatible with reduced maximum timing advance operation (e.g., the short TTI and/or reduced processing time features). Network node 115A may determine whether the deployment of network node 115A is compatible with reduced maximum timing advance operation in any suitable manner. For example, network node 115A may determine whether the deployment of network node 115A is compatible with reduced maximum timing advance operation based on a propagation delay induced by the deployment of network node 115A. Upon determining that the deployment of network node 115A is not compatible with reduced maximum timing advance operation, network node 115A may move wireless device 110A from the first scheduling pool to the second scheduling pool.

Additional examples of the criteria that network node 115A may consider when moving wireless device 110A from the first scheduling pool to the second scheduling pool include: a QoS requirement of wireless device 110A; a grant size requirement of wireless device 110A; and a probability that wireless device 110A will be scheduled in the first scheduling pool. In certain embodiments, network node 115A may determine one or more of a QoS requirement of wireless device 110A; a grant size requirement of wireless device 110A; and a probability that wireless device 110A will be scheduled. Network node 115A may make similar determinations for other wireless devices 110 in addition to wireless device 110A (e.g., wireless device 110B).

Network node 115A may move wireless device 110A from the first scheduling pool to the second scheduling pool based on one or more of the criteria described above. For example, network node 115A may move wireless device 110A from the first scheduling pool to the second scheduling pool if wireless device 110A has non-stringent latency requirements (e.g., non-stringent user data latency requirements, such as a file transfer that is not urgent). As another example, network node 115A may move wireless device 110A from the first scheduling pool to the second scheduling pool it wireless device 110A has a grant size requirement that is above a first threshold value (e.g., a grant size requirement threshold). As still another example, network node 115A may move wireless device 110A from the first scheduling pool to the second scheduling pool it wireless device 110A has a probability or being scheduled in the first scheduling pool that is below a second threshold value (e.g., a threshold probability of being scheduled in the first scheduling pool).

In certain embodiments, network node 115A may move one or more wireless devices 110 assigned to the second scheduling pool back to the first scheduling pool, and vice versa (including moving a wireless device that was moved from the first scheduling pool to the second scheduling pool back to the first scheduling pool). Network node 115A inlay move wireless devices 110 from the second scheduling pool to the first scheduling pool based on any suitable Criteria. For example, network node 115A may move wireless device 110A from the second scheduling pool back to the first scheduling pool based on a change in network conditions. The change in network conditions may be any suitable change in network condition or combination of changes in network condition. As one example, the change in network conditions may be a decrease in a number of wireless devices 110 in the first scheduling pool that can be scheduled with one or more of short TTI and reduced processing time. As another example, the change in network conditions witty be a decrease in an amount of data in a buffer of one or more wireless devices 110 in the first scheduling pool. As still another example, the change in network conditions may be that the grant size requirement of wireless device 110A decreases below the first threshold value (e.g., the grain size requirement threshold). As yet another example, the change in network conditions may be that the probability of the first wireless device being scheduled in the first scheduling pool increases above the second threshold value (e.g., a threshold probability of being scheduled in the first scheduling pool).

Figure 2:
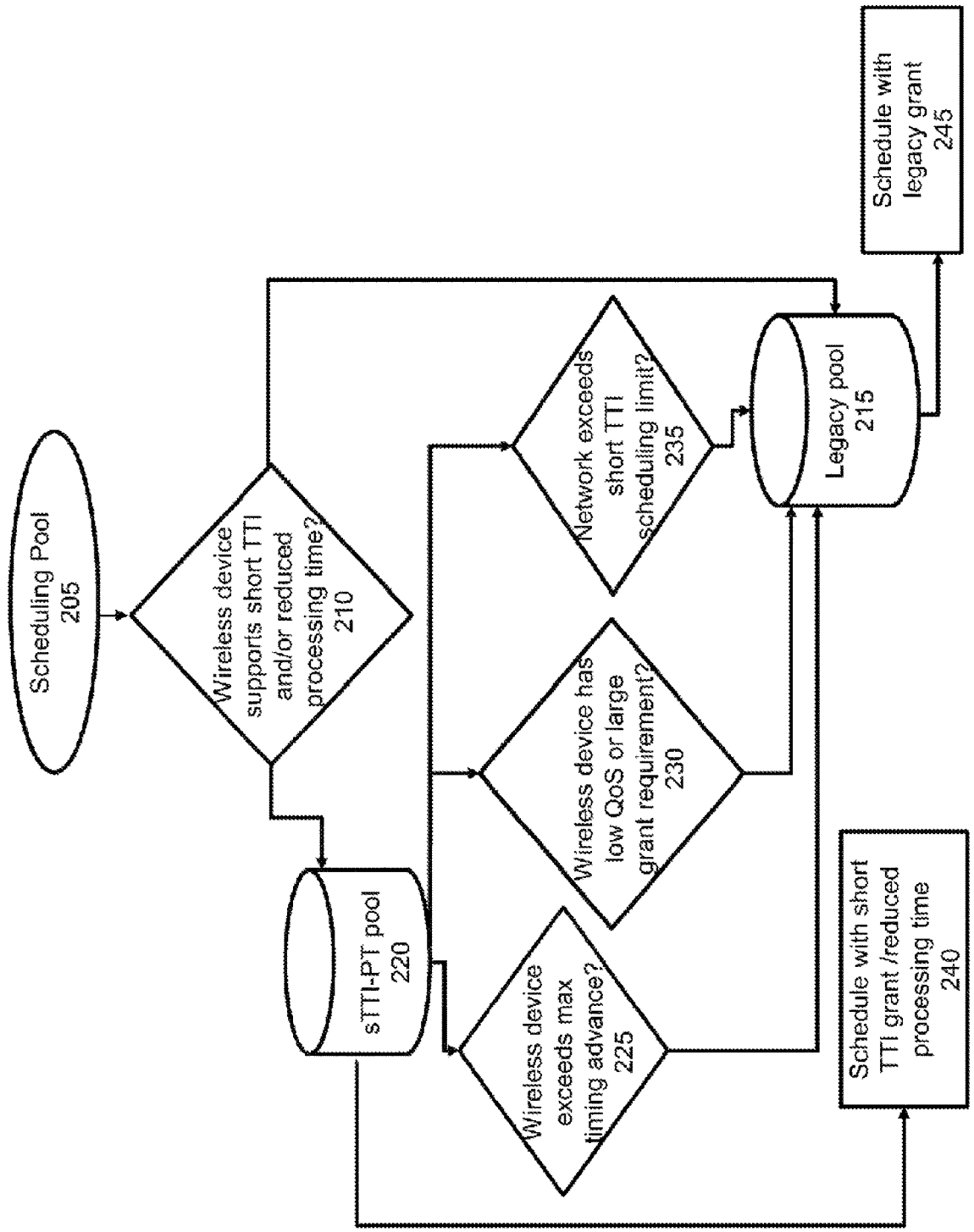
FIG. 2 illustrates an example process for assigning wireless devices to one of at least two available scheduling pools, in accordance with certain embodiments.

FIG. 2 illustrates an example process for assigning wireless devices to one of at least two available scheduling pools, in accordance with certain embodiments. As noted above, during normal LTE operation, the network maintains a pool of users (e.g., wireless devices) that would be scheduled with resources, such as scheduling pool 205 shown in FIG. 2. Each wireless device in scheduling pool 205 has its own scheduling requirements associated with it, including one or more of feature support, grant size requirement, quality of service requirements and channel conditions. In certain embodiments, wireless devices are first segregated among at least two available scheduling pools (e.g., legacy pool 215 and short TTI-PT pool 220 in the example of FIG. 2) based on their support for short TTI and reduced processing time. The wireless devices may then be further divided based on one or more criteria. For example, the wireless devices may be further divided based on the condition that they meet their maximum time alignment value for short TTI or reduced processing tune. As another example, the selected wireless devices can be further divided based on scheduling opportunities for short TTI or reduced processing time, QoS and grant size requirements (e.g., large buffer wireless devices have lower overhead and latency if they are scheduled with normal TTIs) as well as handover to cells with RRHs with long cable delays (affecting the total transmission time). In this way, the most suitable wireless devices are scheduled with short TTI and/or reduced processing times, which leads to overall latency reduction as well as better usage of resources in the network.

According to one example embodiment, a network node maintains two sub pools of wireless devices, a first pool (short TTI-reduced processing time pool 220 (sTTI-PT pool 220 in the example of FIG. 2)) for wireless devices that support one or more of the short TTI and reduced processing time features and a second pool (legacy pool 215 in the example of FIG. 2) for wireless devices that do not support either of the short TTI or reduced processing time features and a second pool or should otherwise not be included in the first pool 220. At decision point 210, the network node segregates the wireless devices in scheduling pool 205 based on whether the wireless devices support one or tore of the short TTI feature and reduced processing time.

Then, the network node further filters wireless devices that support short TTI and/or reduced processing time in short TTI-PT pool 220 based on one or more criteria. For example, the wireless devices may be further filtered based on timing advance values of the wireless devices. At decision point 225, the network node determines whether one or more of the wireless devices assigned to sTTI-PT pool 220 have timing advance values that exceed maximum timing advance values for one or more of the short TTI and the reduced processing time features. In certain embodiments, wireless devices with timing advance values exceeding the maximum allowed timing advance value for the short TTI or reduced processing time features are moved to legacy pool 215 because these wireless devices cannot be scheduled with short or reduced processing time due to exceeding the maximum timing advance values.

In certain embodiments, the sTTi-PT pool 220 may be further filtered based on constituent QoS and/or grant size requirements of wireless devices. At decision point 230 network node 115A may determine whether one or more wireless devices assigned to sTTI-PT pool 220 have non-stringent latency requirements and/or large grant size requirements. Wireless devices found to have non-stringent latency requirements may be moved to legacy pool 215. This helps to prioritize wireless devices with stringent latency requirements that would be able to best utilize the short TTI and/or reduced processing time features (e.g., wireless devices that are using a service that has a low delay requirement, such as a high-priority file transfer, mission-critical push to talk, or another service that requires a low delay). Similarly, wireless devices found to have large grant size requirements (e.g., grant size requirements exceeding a threshold value) may be moved from sTTI-PT pool 220 to legacy pool 215. Since the maximum size of short TTI grants is much smaller than a normal legacy grant, a huge number of consecutive grants would be required to satisfy wireless devices having large grant size requirements. This would starve the other wireless devices in sTTI pool 220. Thus, the must resource-efficient method to handle the wireless devices having large grant size requirements is to move them to legacy pool 215 where they can be satisfied more quickly, thereby using less grants and not starving other users. In certain embodiments, these wireless devices may be moved back to sTTI-PT pool 220 if network conditions change (e.g., if there are no other users to schedule with short TTI and/or reduced processing time, or if the buffers of these wireless devices are low on data).

In certain embodiments, the network node may also consider the maximum number of wireless devices that can be scheduled with short TTI resources and/or reduced processing time in further tittering the wireless devices originally assigned to sTTI-PT pool 220. For example, at decision point 235 the network node determines whether the network exceeds short TTI and/or reduced processing time scheduling limits. In some cases, based on that determination, the network node may determine a probability that one or more wireless devices in sTTI-PT pool 220 will be scheduled. The network node may move wireless devices with low probability of being scheduled from sTTI pool 220 to legacy pool 215. In certain embodiments, wireless devices with low probability of being scheduled may be those wireless devices having a probability of being scheduled that is less than a threshold value. In certain embodiments, a pre-scheduling can be done for all short TTIs in a 1 ms TTI, and the short TTI users not scheduled can instead be scheduled on the normal TTI. In this way, the wireless devices would not be getting the lowest latency but would not be starved by higher priority users. In certain embodiments, once the resources get free in sTTI-PT pool 220, the wireless devices that were moved to legacy pool 215 can be moved back to sTTI-PT pool 220.

In certain embodiments, the deployment of the network node (e.g., base station) may be taken into account. If, for instance, the deployment of the network node is with a RRH that is located at some distance from the radio baseband, a propagation delay is induced between the baseband and the RRH. This delay may be included in the timing advance set by the network node, meaning that timing advance covers both the internal (baseband to RRH) and external (RRH to wireless device) delay. In this case, a group of network nodes may be less compatible with reduced tinting advance operation (e.g., operation of the short TTI and/or reduced processing time features). A wireless device in reduced maximum timing advance operation hat moves into a cell with RRH deployment may therefore be moved to legacy pool 215 in advance, to ensure cell-wide time alignment. This can be done, for example, during handover between cells. A cell filter of minimum timing advance is thereby applied in the process of selecting the scheduling pool.

In certain embodiments, the wireless devices are scheduled based on their assigned pools. For example, at step 240 the network node schedules wireless devices assigned to sTTI-PT pool 220 with a short TTI grant and/or reduced processing time. At step 245, the network node schedules wireless devices assigned to legacy pool 215 with a legacy grant.

Advantageously, segregation of the wireless devices as described herein may result in selection of the most suitable wireless devices for short TTI and/or reduced processing time scheduling, which would lead to enhancement in network latency reduction. The short TTI resources would not be wasted for wireless devices that could not meet the conditions for using short TTI anchor reduced processing and or have lower QoS requirements, or if the network does not have the short TTI resources in general to handle the high grant size requirements. It may also prevent resource starvation for wireless devices in short TTI-PT pool 220 by moving certain wireless devices to legacy pool 215 if the probability of those wireless devices being scheduled is low.

Additionally, the various embodiments described herein for short TTI and reduced processing time utilization may advantageously lead to enhanced energy utilization of the radio network. Scheduling wireless devices with large grant requirements with legacy grants instead of short TTI grants helps to save the extra control bits required to transmit the same data with a large number of short TTI grants.

As described above, wireless devices may be originally assigned to one of at least two available scheduling pools, such as legacy pool 215 and short TTI-PT pool 220, based on their support for one or more, of short TTI and reduced processing time features and, in certain embodiments, one or more other criteria. The assignment of wireless devices to legacy pool 215 and short TTI-PT pool 220 should not be considered a static process. Rather, the network node may at certain times (e.g., periodically) reevaluate the wireless devices and their assignment to a particular pool legacy pool 215 or short TTI-PT pool 220) to determine whether one or more wireless devices should be moved from short TTI-PT pool 220 to legacy pool 215 or from legacy pool 215 to short TTI-PT pool 220. The process for reassigning a wireless device from one pool to another are described in more detail below in relation to FIGS. 3A and 3B.

Figure 3A:
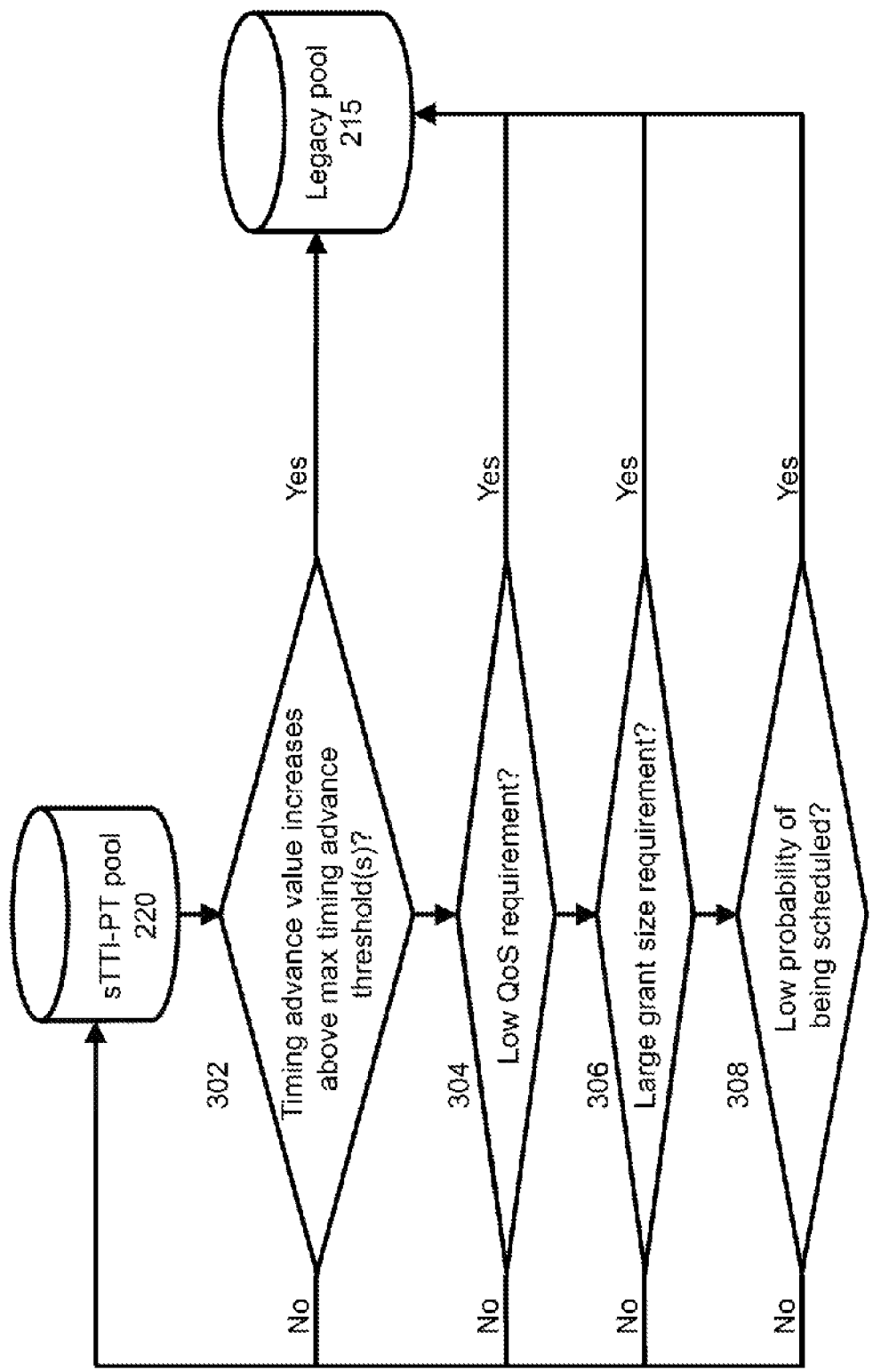
FIG. 3A illustrates an example process for moving wireless devices assigned to the short TTI-PT pool to the legacy pool, in accordance with certain embodiments.

FIG. 3A illustrates an example process for moving wireless devices assigned to short TTI-PT pool 220 to legacy pool 215, in accordance with certain embodiments. As described above in relation to FIGS. 1 and 2, a wireless device may be assigned to short TTI-PT pool 220 if, for example, one or more of the hallowing are true: it supports one or more of the short TTI and reduced processing time features; has a timing advance value that does not exceed the maximum timing advance value for one or more of short TTI and reduced processing time; has high QoS requirement; has a small grant site requirement; the deployment of the network node is compatible with reduced timing advance operation; and or the network has not exceeded short TTI scheduling limits.

As described above, each wireless device has its own scheduling requirements, including one or more of feature support, grant sire requirements, quality of service requirements, and channel conditions. In some cases, these and other network conditions may change, thereby necessitating movement of a wireless device from sTTI-PT pool 220 to legacy pool 215. The network node may periodically reevaluate these and potentially other conditions in determining whether to move a wireless deice from sTTI-PT pool 220 to legacy pool 215.

For example, assume that a first wireless device has been assigned to short TTI-PT pool 220 in the example of FIG. 3A. The network node may reevaluate whether the first wireless device should be assigned to short TTI-PT pool 220 through a series of decision steps. For example, at decision point 302, the network node considers whether the timing advance value of the first wireless device has increased above one or more threshold values (e.g., increased above a maximum allowed timing advance value for one or more of the short TTI and the reduced processing time). As noted above, the timing advance value of a wireless device may change, for example based on the position of the wireless device in a cell. Thus, the timing advance value may increase or decrease over time, such that it is no longer the same as when the first wireless device was originally assigned to short TTI-PT pool 220. If at decision point 302 the network node determines that the timing advance value of the first wireless device has increased above the maximum allowed timing advance value for one or more of the short TTI and the reduced processing time, the network node will move the first wireless device from short TTI-PT pool 220 to legacy pool 215, as shown in FIG. 3A. If, however, the network node determines that the timing advance value of the first wireless device has not increased above the maximum allowed timing advance value for one or more of the short TTI and the reduced processing time, the network node will not move the first wireless device and the first wireless device will remain in short TTI-PT pool 220.

As noted above, the first wireless device may have been assigned to short TTI-PT pool 220 at least in part because it had a high QoS requirement (e.g., stringent latency requirements). At decision point 304, the network node determines whether the first wireless device now has a low QoS requirement (e.g., now has non-stringent latency requirements). If, at decision point 304, it is determined that the first wireless device now has a low QoS requirement, the network node may move the first wireless device from short TTI-PT pool 220 to legacy pool 215, as shown in the example of FIG. 3A. If, however, the network node determines that the first wireless device still has a high QoS requirement (e.g., stringent latency requirements), the network node will not move the first wireless device and the first wireless device will remain in short TTI-PT pool 220.

It is possible that the first wireless device may have been assigned to short TTI-PT pool 220 at least in part because it did not have a large grant size requirement. At decision point 306, the network node determines whether the first wireless device now has a large grant size requirement (e.g., a grant size requirement that is above a grant size requirement threshold). If, at decision point 306, it is determined that the first wireless device now has a large grant size requirement, the network node may move the first wireless device from short TTI-PT pool 220 to legacy pool 215, as shown in the example of FIG. 3A. If, however, the network node determines that the first wireless device still has a low grant sire requirement (e.g., a grant size requirement that is below the gram sire requirement threshold), the network node will not move the first wireless device and the first wireless device will remain in short TTI-PT pool 220.

It is possible that the first wireless device may have been assigned to short TTI-PT pool 220 at least in pan because it did not have a low probability of being scheduled in short TTI-PT pool 220. At decision point 308, the network node determines whether the first wireless device now has a low probability of being scheduled. If, at decision point 308, it is determined that the first wireless device now has a low probability of being scheduled in sTTI-PT pool 220, the network node may move the first wireless device from short TTI-PT pool 220 to legacy pool 215, as shown in the example of FIG. 3A. If, however, the network node determines that the first wireless device does not have a low probability of being scheduled in short TTI-PT pool 220, the network node will not move the first wireless device and the first wireless device will remain in short TTI-PT pool 220.

Although FIG. 3A illustrates a series of decision steps related to certain criteria, this is for purposes of example only. The present disclosure contemplates that network node 115 may determine to move a wireless device from short TTI-PT pool 220 to legacy pool 215 based on all, some, or none of the criteria described in relation to FIG. 3A. In certain embodiments, network node 115 may consider other criteria instead of or in addition to those illustrated in the example FIG. 3A in determining whether to move a wireless device from short TTI-PT pool 220 to legacy pool 215. Furthermore, the criteria may be considered in any order and the present disclosure is not limited to the example series illustrated in FIG. 3A. In some cases, the various criteria may be considered in parallel.

Figure 3B:
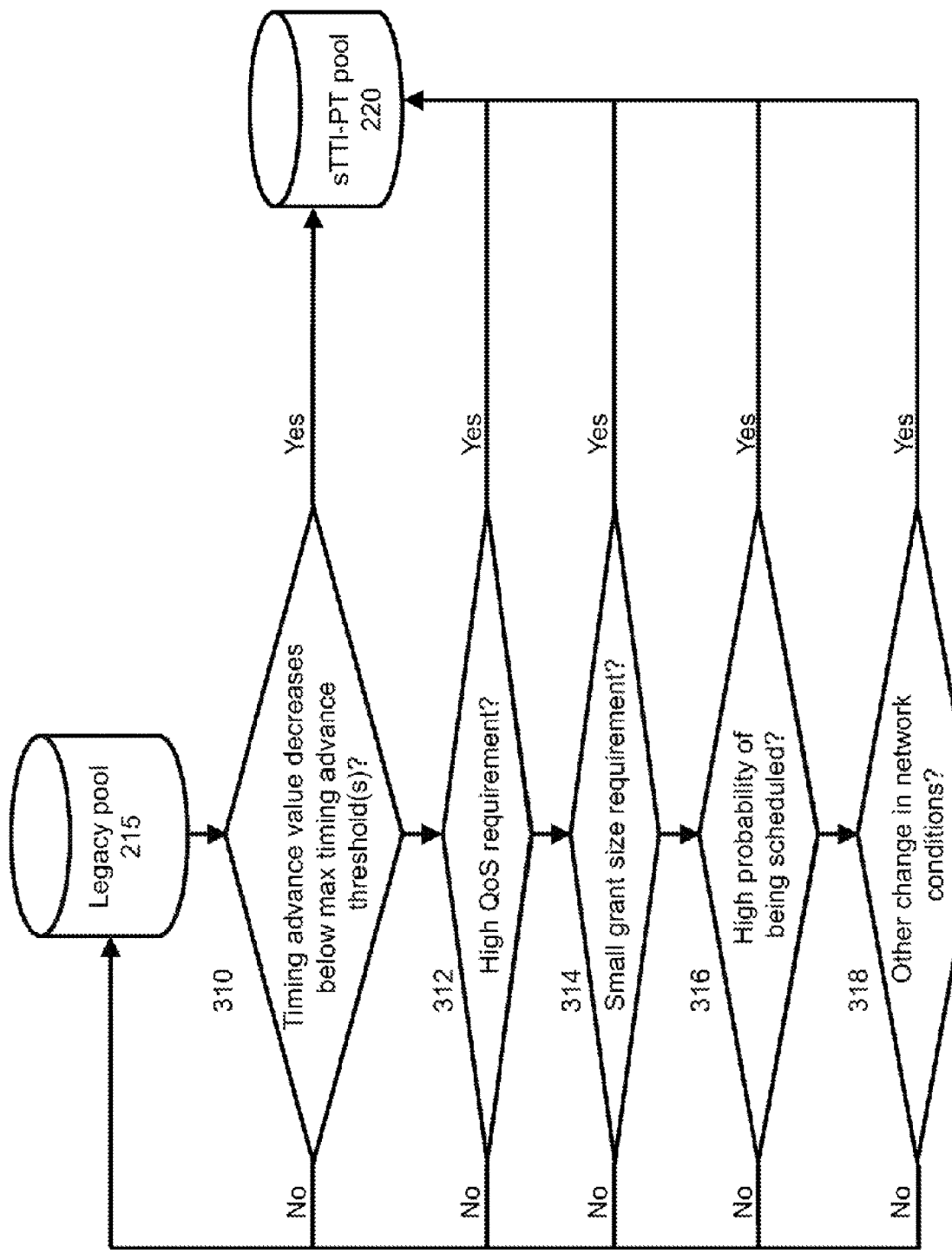
FIG. 3B illustrates an example process for moving wireless devices assigned to the legacy pool to the sTTI-PT pool, in accordance with certain embodiments.

FIG. 3B illustrates an example process for moving wireless devices assigned to legacy pool 215 to sTTI-PT pool 220, in accordance with certain embodiments. As described above in relation to FIGS. 1 and 2, a wireless device may be assigned to legacy pool 215 if, for example, one or more of the following are true; it does not support one or more of the short TTI and reduced processing time features; has a timing advance value that exceeds the maximum timing advance value for one or more of short TTI and reduced processing time; has low QoS requirement; has a large grant size requirement; the deployment of the network node is not compatible with reduced timing advance operation; and/or the network has not exceeded short TTI scheduling limits.

As described above, each wireless device has its own scheduling requirements, including one or more of feature support, grant size requirements, quality of service requirements, and channel conditions. In some cases, these and other network conditions may change, thereby necessitating movement of a wireless device from legacy pool 215 to sTTI-PT pool 220. The network node may periodically reevaluate these and potentially other conditions in determining whether to move a wireless device from legacy pool 215 to sTTI-PT pool 220.

For example, assume that a second wireless device has been assigned to legacy pool 215 in the example of FIG. 3B. The network node may reevaluate whether the second wireless device should be assigned to legacy pool 215 through a series of decision steps. For example, at decision point 310, the network node considers whether the timing advance value of the second wireless device has decreased below one or more threshold values (e.g., decreased below a maximum allowed timing advance value for one or more of the short TTI and the reduced processing time). As noted above, the timing advance value of a wireless device may change, for example based on the position of the wireless device in a cell. Thus, the timing advance value or the second wireless device may increase or decrease over time, such that it is no longer the same as when the second wireless device was originally assigned to legacy pool 215. If at decision point 310 the network node determines that the timing advance value of the second wireless device has decreased below the maximum allowed timing advance value for one or more of the short TTI and the reduced processing time, the network node will move the second wireless device from legacy pool 215 to short TTI-PT pool 220, as shown in FIG. 3B. If however, the network node determines that the timing advance value of the second wireless device still exceeds the maximum allowed timing advance value for one or more of the short TTI and the reduced processing time, the network node will not move the second wireless device and the second wireless device will remain in legacy pool 215.

As noted above, the second wireless device may have been assigned to legacy pool 215 at least in part because it had a low QoS requirement (e.g., non-stringent latency requirements). At decision point 312, the network node determines whether the second wireless device now has a high QoS requirement (e.g., now has stringent latency requirements). If, at decision point 312, it is determined that the second wireless device now has a high QoS requirement, the network node may move the second wireless device from legacy pool 215 to short TTI-PT pool 220, as shown in the example of FIG. 3B. If, however, the network node determines that the second wireless device still has a low QoS requirement (e.g., non-stringent latency requirements), the network node will not move the second wireless device and the second wireless device will remain in legacy pool 215.

It is possible that the second wireless device may have been assigned to legacy pool 215 at least in part because it had a large grant size requirement. At decision point 314, the network node determines whether the second wireless device now has a small grant size requirement (e.g., a grant size requirement that is below a grant size requirement threshold). If, at decision point 314, it is determined that the second wireless device now has a small grant size requirement, the network node may move the second wireless device from legacy pool 215 to short TTI-PT pool 220, as shown in the example of FIG. 3B. If, however, the network node determines that the second wireless device still has a high grant size requirement (e.g., a grant size requirement that is above the grant size requirement threshold), the network node will not move the second wireless device and the second wireless device will remain in legacy pool 215.

It is possible that the second wireless device may have been assigned to legacy pool 215 at least in part because it had a low probability of being scheduled in short TTI-PT pool 220. For example, at the time the second wireless device was assigned to legacy pool 215, the network may have exceeded its short TTI and/or reduced processing time scheduling limit. At decision point 316, the network node determines whether the second wireless device now has a high probability of being scheduled in short TTI-PT pool 221). If, at decision point 316, it is determined that the second wireless device now has a high probability of being scheduled in sTTI-PT pool 220 (for example, because the network is no longer exceeding its short TTI and/or reduced processing time scheduling limit), the network node may move the second wireless device from legacy pool 215 to short TTI-PT pool 220, as shown in the example of FIG. 3B.

If, however, the network node determines that the second wireless device does not have a high probability of being scheduled in short TTI-PT pool 220, the network node will not move the second wireless device and the second wireless device will remain in legacy pool 215.

At step 318, the network node determines whether one or more other network conditions have changed such that the second wireless device should be moved from legacy pool 215 to short TTI-PT pool 220. For example, the network node may determine whether there has been a decrease in a number of wireless devices in short TTI-PT pool 220 that can be scheduled with one or more of short TTI and reduced processing time. As another example, the network node may determine whether there has been a decrease in an amount of data in a buffer of one or more wireless devices in short TTI-PT pool 220. If, at decision point 318, it is determined that network conditions have changed (e.g., the number of wireless devices in short TTI-PT pool 220 that can be scheduled with one or more of short TTI and reduced processing time has decreased or there has been a decrease in an amount of data in the buffer of one or more wireless devices in short TTI-PT pool 220), the network node may move the second wireless device from legacy pool 215 to short TTI-PT pool 220, as shown in the example of FIG. 3B. If, however, the network node determines that network conditions have not changed, the network node will not move the second wireless device and the second wireless device will remain in legacy pool 215.

Although FIG. 3B illustrates a series of decision steps related to certain criteria, this is for purposes of example only. The present disclosure contemplates that network node 115 may determine to move a wireless device from legacy pool 215 to short TTI-PT pool 220 based on all, some, or none of the criteria described in relation to FIG. 3B. In certain embodiments, network node 115 may consider other criteria instead of or in addition to those illustrated in the example FIG. 3B in determining whether to move a wireless device from legacy pool 215 to short TTI-PT pool 220. Furthermore, the criteria may be considered in any order and the present disclosure is not limited to the example series illustrated in FIG. 3B. In some cases, the various criteria may be considered in parallel.

Figure 4:
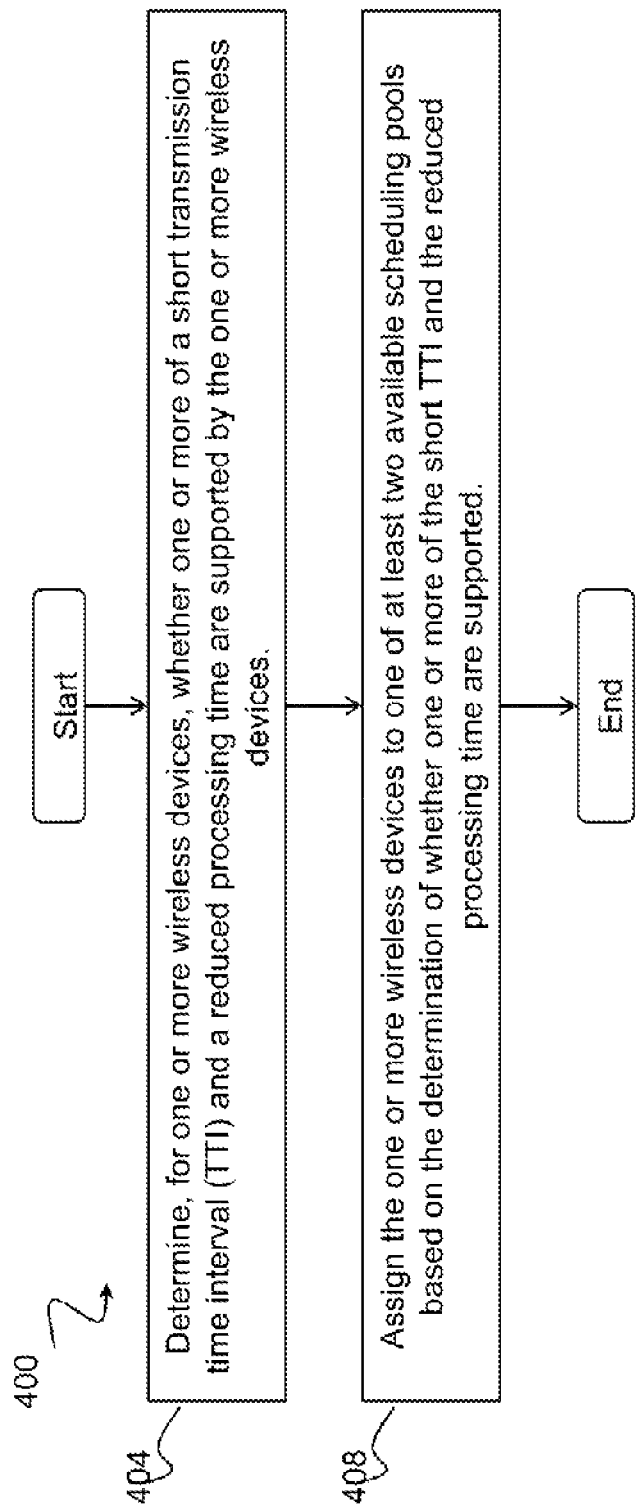
FIG. 4 is a flow diagram of a method in a network node, in accordance with certain embodiments.

FIG. 4 is a flow diagram of a method 400 in a network node, in accordance with certain embodiments. Method 400 begins at step 404, where the network node determines, for one or more wireless devices, whether one or more of a short TTI and a reduced processing time are supported by the one or more wireless devices. In certain embodiments, the method may comprise obtaining capability information for the one or more wireless devices, the capability information indicating whether the one or more wireless devices support one or more of the short TTI and the reduced processing time. The determination of whether the one or more wireless devices support one or more of a short TTI and a reduced processing time may be based on the obtained capability information.

At step 408, the network node assigns the one or more wireless devices to one of at least two available scheduling pools based on the determination of whether one or more of the short and the reduced processing time are supported.

In certain embodiments, assigning the one or more wireless devices to one of at least two available scheduling pools based on the determination of whether one or more of the short TTI and the reduced processing time are supported may comprise assigning one or more wireless devices determined to support one or more of the short TTI and the reduced processing time to a first scheduling pool, and assigning one or more wireless devices determined not to support one or more of the short TTI and the reduced processing time to a second scheduling pool.

In certain embodiments, the method may comprise scheduling the one or more wireless devices based on the assigned scheduling pool. Scheduling the one or more wireless devices based on the assigned scheduling pool may comprise scheduling the one or more wireless devices assigned to the first scheduling pool with one or more of a short TTI and reduced processing time, and scheduling the one or more wireless devices assigned to the second scheduling pool with a legacy grant.

In certain embodiments, the method may comprise determining whether a timing advance value of the one or more wireless devices is below one or more threshold values. Assigning the one or more wireless devices to one of the at least two available scheduling pools may be further based on the determination of whether the timing advance value of the one or more wireless devices is below the one or more threshold values.

In certain embodiments, the method may comprise moving a first wireless device assigned to the first scheduling pool to the second scheduling pool based on one or more criteria, wherein the first wireless device assigned to the first scheduling pool has a timing advance value that is below the one or more threshold values. In certain embodiments, the one or more criteria may comprise the timing advance value of the first wireless device. The method may comprise determining whether the timing advance value of the first wireless device has increased above a maximum allowed timing advance value for one or more of the short TTI and the reduced processing time, and upon determining that the timing advance value of the first wireless device has increased above the maximum allowed timing advance value for one or more of the short TTI and the reduced processing time, moving the first wireless device assigned to the first scheduling pool to the second scheduling pool.

In certain embodiments, the one or more criteria may comprise a deployment of the network node. The method may comprise determining a deployment of the network node, and determining whether the deployment of the network node is compatible with reduced maximum timing advance operation. The method may comprise upon determining that the deployment of the network node is not compatible with reduced maximum timing advance operation, moving the first wireless device assigned to the first scheduling pool to the second scheduling pool. In certain embodiments, determining whether the deployment of the network node is compatible with reduced maximum timing advance operation may comprise determining, based on a propagation delay induced by the deployment of the network node, whether the deployment of the network node is compatible with reduced maximum timing advance operation.

In certain embodiments, moving the first wireless device assigned to the first scheduling pool to the second scheduling pool based on one or more criteria may comprise at least one of moving the first wireless device assigned to the first scheduling pool to the second scheduling pool if the first wireless device has non-stringent latency requirements; moving the first wireless device assigned to the first scheduling pool to the second scheduling pool if the first wireless device has a grant size requirement that is above a first threshold; moving the first wireless device assigned to the first scheduling pool to the second scheduling pool if the first wireless device has a probability of being scheduled in the first scheduling pool that is below a second threshold; and moving the first wireless device assigned to the first scheduling pool to the second scheduling pool if the deployment of the network node is not compatible with reduced timing advance operation.

In certain embodiments, the method may comprise moving the first wireless device from the second scheduling pool back to the first scheduling pool based on a change in network conditions. The change in network conditions may comprise at least one of: a decrease in a number of wireless devices in the first scheduling pool that can be scheduled with one or more of short TTI and reduced processing time; a decrease in an amount of data in a buffer of one or more wireless devices in the first scheduling pooh the grant size requirement or the first wireless device decreases below the first threshold; the probability of the first wireless device being scheduled in the first scheduling pool increases above the second threshold; and the timing advance value of the first wireless device decreases below the one or more threshold values.

In certain embodiments, the one or more criteria may comprise one or more of: the timing advance value of the first wireless device; a quality of service requirement of the first wireless device; a grant size requirement of the first wireless device; a probability that the first wireless device in the first scheduling pool will be scheduled; and a deployment of the network node. In certain embodiments, the method may comprise determining one or more of: a timing advance value of the one or more wireless devices; a quality of service requirement of the one or more wireless devices; a grant size requirement of the one or more wireless devices; a probability that the one or more wireless devices will be scheduled; and a deployment or the network node.

Figure 5:
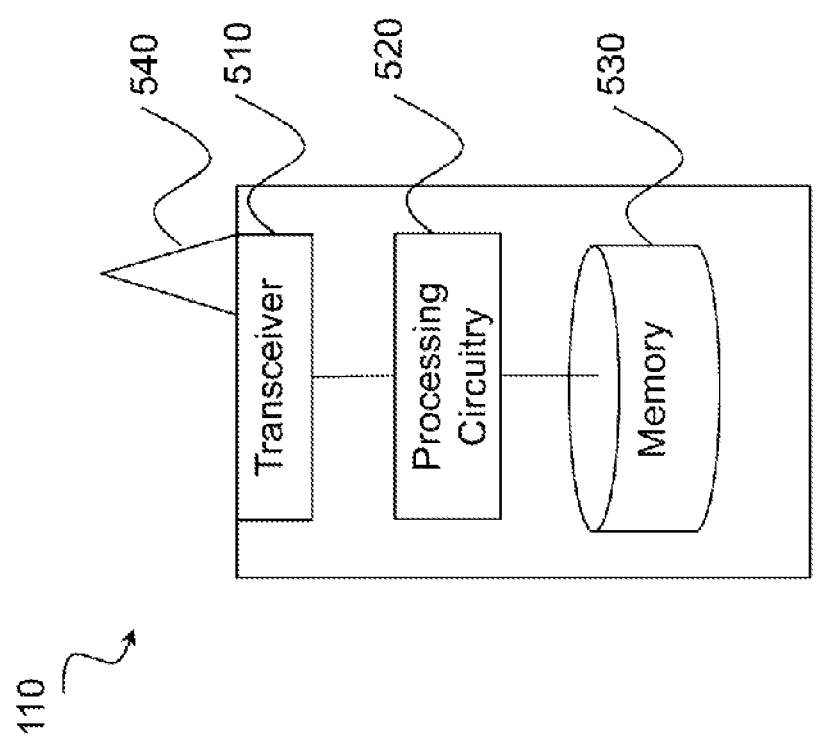
FIG. 5 is a block schematic of an exemplary wireless device, in accordance with certain embodiments.

FIG. 5 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 510, processing circuitry 520, and memory 530. In some embodiments, transceiver 510 facilitates transmitting wireless signals to and receiving wireless signals from network node 115 (e.g., via antenna 540), processing circuitry 520 executes instructions to provide some or all of the functionality described above as being provided by wireless device 110, and memory 530 stores the instructions executed by processing circuitry 520.

Processing circuitry 520 may include any suitable combination of hardware and software implemented in one or more modules to execute instructions and manipulate data to perform some or all of the described functions of wireless device 110, such as the functions of wireless device 110 described above in relation to FIGS. 1-4. In some embodiments, processing circuitry 520 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk. (CD) or a Digital Video Disk (DVD)), and/or or any other volatile or non-volatile, non-transitory computer-readable and/or computer-executable memory devices that store information, data, and/or instructions that may be used by processor 1020.

Other embodiments of wireless device 110 may include additional components beyond those shown in FIG. 5 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of processing circuitry 520. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 6:
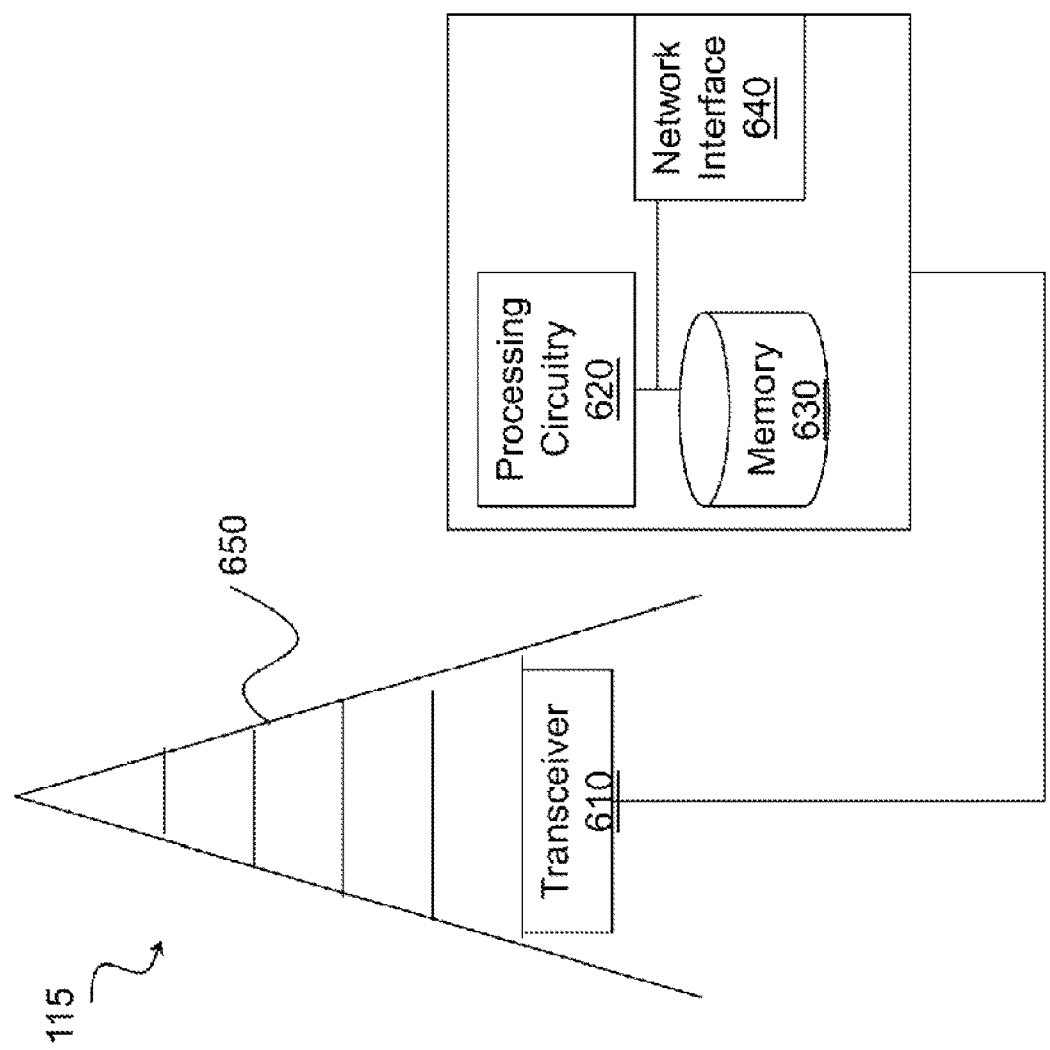
FIG. 6 is a block schematic of an exemplary network node, in accordance with certain embodiments.

FIG. 6 is a block schematic of an exemplary network node, in accordance with certain embodiments. Network node 115 may be any type of radio network node or any network node that communicates with a UE and or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 610, processing circuitry 620, memory 630, and network interface 640. In some embodiments, transceiver 610 facilitates transmitting wireless signals to and receiving wireless signals from wireless device 110 (e.g., via antenna 650), processing circuitry 620 executes instructions to provide some or all of the functionality described above as being provided by a network node 115, memory 630 stores the instructions executed by processing circuitry 620, and network interface 640 communicates signals to backend network components, such as a gateway, switch, router, Internet, Public Switched Telephone Network (PSTN), core network nodes or radio network controllers 130, etc.

Processing circuitry 620 may include any suitable combination of hardware and software implemented in one or more modules to execute instructions and manipulate data to perform some or all of the described functions of network node 115, such as those described above in relation to FIGS. 1-4 above. In some embodiments, processing circuitry 620 may include, for example, one or more computers, one or more CPUs, one or more microprocessors, one or more applications, one or more ASICs, one or more FPGAs and/or other logic.

Memory 630 is generally operable to store instructions such as a computer program, software, an application including one or more of logic, rules, algorithms, code, tables, etc. and/or other instructions capable of being executed by a processor. Examples of memory 630 include computer memory (for example, RAM or ROM), mass storage media (for example, a hard disk), removable storage media (for example, a CD or a DVD), and/or or any other volatile or non-volatile, non transitory computer readable and/or computer executable memory devices that store information.

In some embodiments, network interface 640 is communicatively coupled to processing circuitry 620 and may refer to any suitable device operable to receive input for network node 115, send output from network node 115, perform suitable processing of the input or output or both, communicate to other devices, or any combination of the preceding. Network interface 640 may include appropriate hardware (e.g., port, modem, network interlace card, etc.) and software, including protocol conversion and data processing capabilities, to communicate through a network.

Other embodiments of network node 115 may include additional components beyond those shown in FIG. 6 that may be responsible for providing certain aspects of the radio network node's functionality, including any of the functionality described above and/or any additional functionality (including any functionality necessary to support the solutions described above). The various different types of network nodes may include components baying the same physical hardware but configured (e.g., via programming) to support different radio access technologies, or may represent partly or entirely different physical components.

Figure 7:
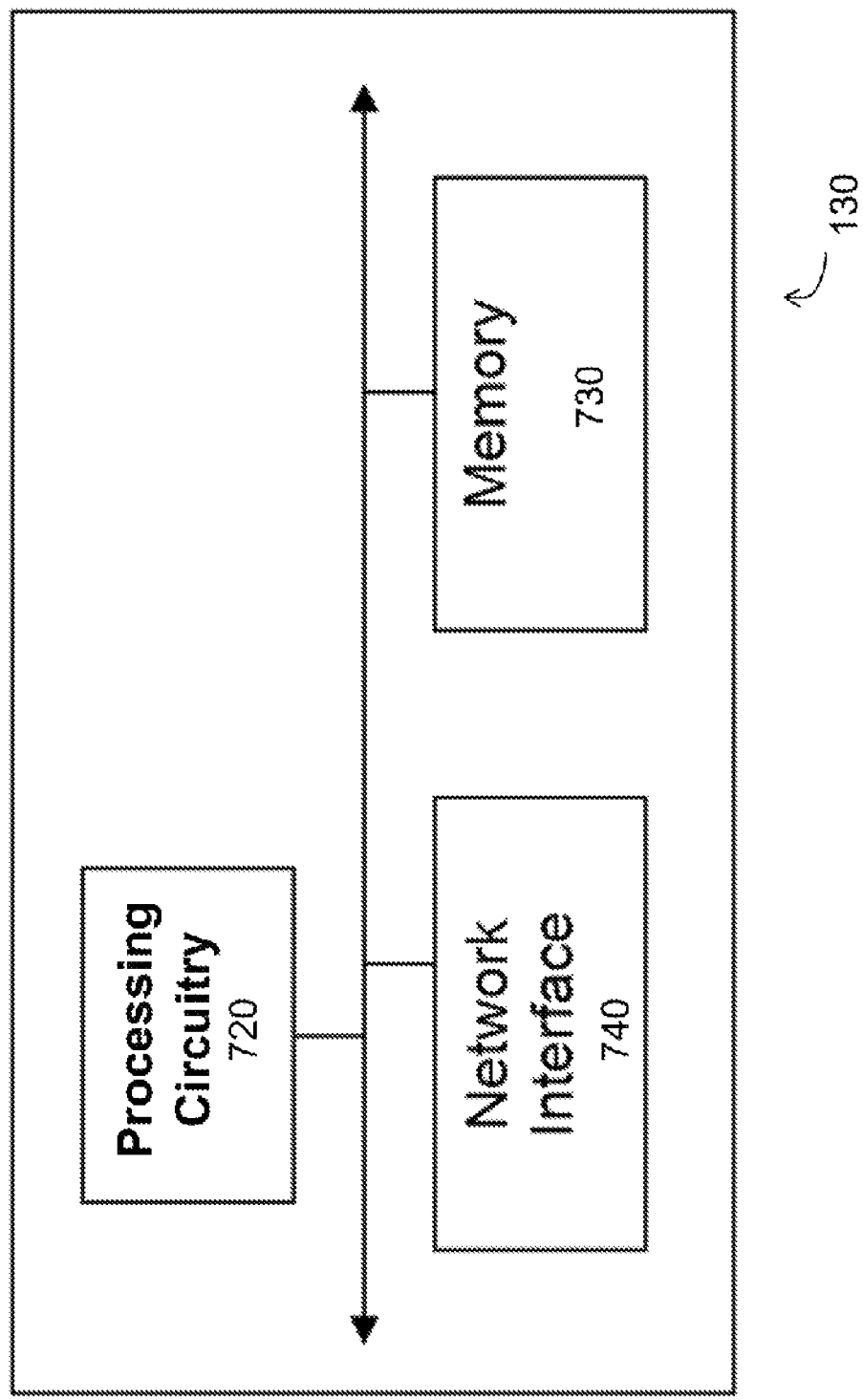
FIG. 7 is a block schematic of an exemplary radio network controller or core network node, in accordance with certain embodiments.

FIG. 7 is a block schematic or an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 720, memory 730, and network interface 740. In some embodiments, processing circuitry 720 executes instructions to provide some or all of the functionality described above as being provided by the network node, memory 730 stores the instructions executed by processing circuitry 720, and network interface 740 communicates signals to any suitable node, such as a gateway, switch, router, Internet, Public Switched Telephone Network (PSTN), network nodes 115, radio network controllers or core network nodes 130, etc.

Processing circuitry 720 may include any suitable combination of hardware and software implemented in one or more modules to execute instructions and manipulate data to perform some or all of the described functions of the radio network controller or core network node 130. In some embodiments, processing circuitry 720 may include, for example, one or more computers, one or more CPUs, one or more microprocessors, one or more applications, one or more ASICs, one or more FPGAs and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 740 is communicatively coupled to processing circuitry 720 and may refer to any suitable device operable to receive input for the network node, send output from the network node, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of the network node may include additional components beyond those shown in FIG. 7 that may be responsible for providing certain aspects or the network node's functionality, including any of the functionality described above and/or any additional functionality (including any functionality necessary to support the solution described above).

Figure 8:
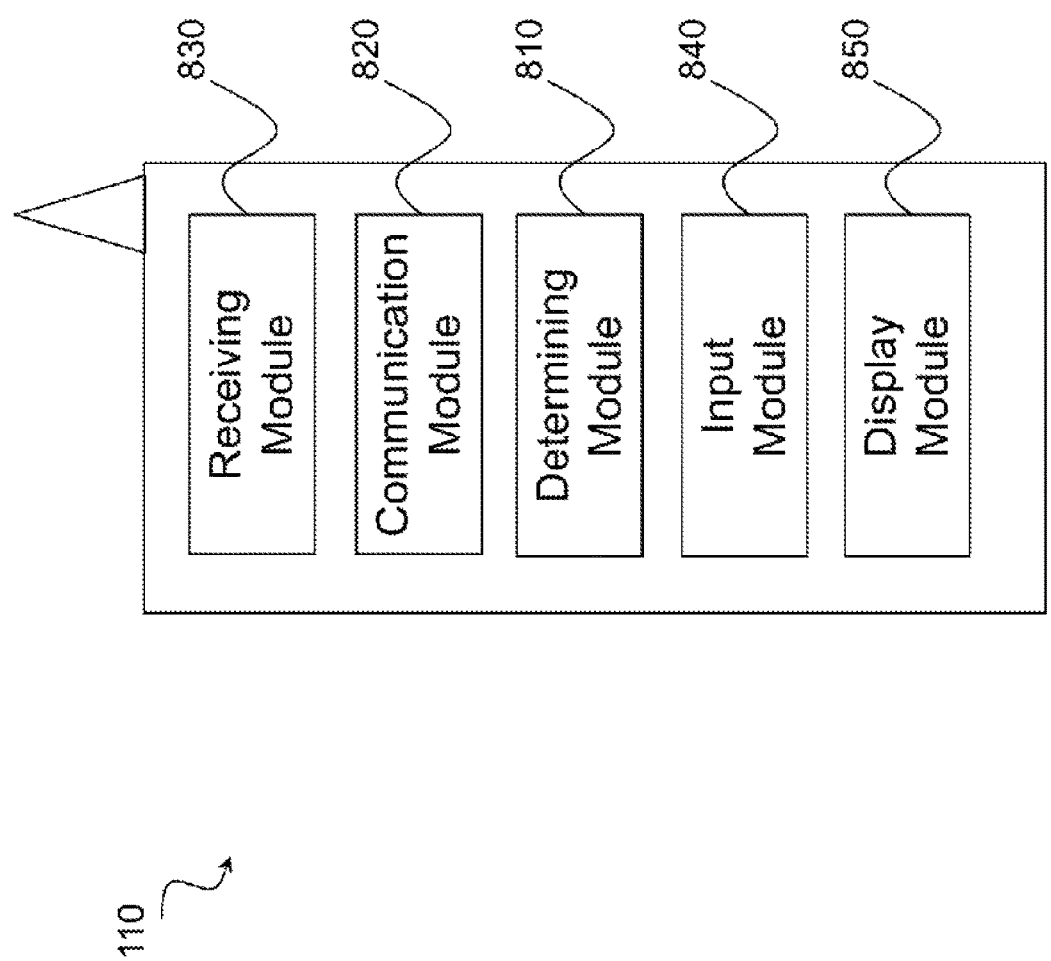
FIG. 8 is a block schematic of an exemplary wireless device, in accordance with certain embodiments.

FIG. 8 is a block schematic of an exemplary wireless device, in accordance with certain embodiments. Wireless device 110 may include one or more modules. For example, wireless device 110 may include a determining module 810, a communication module 820, a receiving module 830, an input module 840, a display module 850, and any other suitable modules. In some embodiments, one or more of determining module 810, communication module 820, receiving module 830, input module 840, display module 850, or any other suitable module may be implemented using one or more processors, such as processing circuitry 520 described above in relation to FIG. 5. In certain embodiments, the functions of two or more of the various modules may be combined into a single module. Wireless device 110 may perform the methods for handling users with different timing alignment requirements described above with respect to FIGS. 1-4.

Determining module 810 may perform the processing functions of wireless device 110. Determining module 810 may include or be included in one or more processors, such as processing circuitry 520 described above in relation to FIG. 5. Determining module 810 may include analog and/or digital circuitry configured to perform any of the functions of determining module 810 and/or processing circuitry 520 described above. The functions of determining module 810 described above may, in certain embodiments, be performed in one or more distinct modules.

Communication module 820 may perform the transmission functions of wireless device 110. For example, communication module 820 may send capability information to a network node, the capability information indicating whether the wireless device supports one or more of the short TTI and the reduced processing time. Communication module 820 may transmit messages to one or more of network nodes 115 of network 100. Communication module 820 may include a transmitter and/or a transceiver, such as transceiver 510 described above in relation to FIG. 5. Communication module 820 may include circuitry configured to wirelessly transmit messages and/or signals. In particular embodiments, communication module 820 may receive messages and/or signals for transmission from determining module 810. In certain embodiments, the functions of communication module 820 described above may be performed in one or more distinct modules.

Receiving module 830 may perform the receiving functions of wireless device 110. Receiving module 830 may include a receiver and/or a transceiver, such as transceiver 510 described above in relation to FIG. 5. Receiving module 830 may include circuitry configured to wirelessly receive messages and/or signals. In particular embodiments, receiving module 830 may communicate received messages and/or signals to determining module 810. The functions of receiving module 830 described above may, in certain embodiments, be performed in one or more distinct modules.

Input module 840 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 810.

Display module 850 may present signals on a display of wireless device 110. Display module 850 may include the display and/or any appropriate circuitry and hardware configured to present signals on the display. Display module 850 may receive signals to present on the display from determining module 810.

Determining module 810, communication module 820, receiving module 830, input module 840, and display module 850 may include any suitable configuration of hardware and/or software. Wireless device 110 may include additional modules beyond those shown in FIG. 8 that may be responsible for providing any suitable functionality, including any of the functionality described above and/or any additional functionality (including any functionality necessary to support the various solutions described herein).

FIG. 9 is a block schematic of an exemplary network node 115, in accordance with certain embodiments. Network node 115 may include one or more modules. For example, network node 115 may include determining module 910, communication module 920, receiving module 930, and any other suitable modules. In some embodiments, one or more of determining module 910, communication module 920, receiving module 930, or any other suitable module may be implemented using one or more processors, such as processing circuitry 620 described above in relation to FIG. 6. In certain embodiments, the functions of two or more of the various modules may be combined into a single module. Network node 115 may perform the methods for handling users with different timing alignment requirements described above with respect to FIGS. 1-4.

Determining module 910 may perform the precessing functions of network node 115. For example, determining module 910 may determine, for one or more wireless devices, whether one or more of a short TTI and a reduced processing time are supported by the one or more wireless devices. As another example, determining module 910 may assign the one or more wireless devices to one of at least two available scheduling pools based on the determination of whether one or more of the short TTI and the reduced processing time are supported. In certain embodiments, determining module 910 may assign one or more wireless devices determined to support one or more of the short TTI and the reduced processing time to a first scheduling pool. In certain embodiments, determining module 910 may assign one or more wireless devices determined not to support one or more or the short TTI and the reduced processing time to a second scheduling pool (215).

As still another example, determining module 910 may schedule the one or more wireless devices based on the assigned scheduling pool. In certain embodiments, determining module 910 may schedule the one or more wireless devices assigned to the first scheduling pool with one or more of a short TTI and reduced processing time. In certain embodiments, determining module 910 may schedule the one or more wireless devices assigned to the second scheduling pool with a legacy grant.

As another example, determining module 910 may determine whether a timing advance value of the one or more wireless devices is below one or more threshold values. Determining module 910 may assign the one or more wireless devices to one of the at least two available scheduling pools based on the determination of whether the liming advance value of the one or more wireless devices is below the one or more threshold values.

As another example, determining module 910 may move a first wireless device assigned to the first scheduling pool (e.g., a wireless device with a timing advance value that is below the one or more threshold values) to the second scheduling pool based on one or more criteria (e.g., one or more of the timing advance value of the first wireless device, a quality of service requirement of the first wireless device, a grant site requirement of the first wireless device, a probability that the first wireless device in the first scheduling pool will be scheduled, and a deployment of the network node). In certain embodiments, the one or more criteria may comprise the timing advance value of the first wireless device. In such a scenario, determining module 910 may determine whether the timing advance value of the first wireless device has increased above a maximum allowed timing advance value for one or more of the short TTI and the reduced processing time. Upon determining that the timing advance value of the first wireless device has increased above the maximum allowed timing advance value for one or more of the short TTI and the reduced processing time, determining module 910 may move the first wireless device, assigned to the first scheduling pool to the second scheduling pool.

In certain embodiments, the one or more criteria may comprise a deployment of network node 115. In such a scenario, determining module 910 may determine a deployment of the network node and determine whether the deployment of the network node is compatible with reduced maximum timing advance operation. Upon determining that the deployment of the network node is not compatible with reduced maximum timing advance operation, determining module 910 may move the first wireless device assigned to the first scheduling pool to the second scheduling pool. In certain embodiments, determining module 910 may determine whether the deployment of the network node is compatible with reduced maximum timing advance operation at least in part by determining, based on a propagation delay induced by the deployment of the network node, whether the deployment of the network node is compatible with reduced maximum timing advance operation.

In certain embodiments, determining module 910 may move the first wireless device assigned to the first scheduling pool to the second scheduling pool if the first wireless device has non-stringent latency requirements. In certain embodiments, determining module 910 may move the first wireless device assigned to the first scheduling pool to the second scheduling pool if the first wireless device has a grant size requirement that is above a first threshold. In certain embodiments, determining nodule 910 may move the first wireless device assigned to the first scheduling pool to the second scheduling pool if the first wireless device has a probability of being scheduled in the first scheduling pool that is below a second threshold. In certain embodiments, determining module 910 may move the first wireless device assigned to the first scheduling pool to the second scheduling pool if the deployment of the network node is not compatible with reduced timing advance operation.

As another example, determining module 910 may move the first wireless device from the second scheduling pool back to the first scheduling pool based on a change in network conditions. In certain embodiments, determining module 910 may move the first wireless device from the second scheduling pool back to the first scheduling pool based on a decrease in a number of wireless devices in the first scheduling pool that can be scheduled with one or more of short TTI and reduced processing time. In certain embodiments, determining module 910 may move the first wireless device from the second scheduling pool back to the first scheduling pool based on a decrease in an amount of data in a buffer of one or more wireless devices in the first scheduling pool. In certain embodiments determining module 910 may move the first wireless device from the second scheduling pool back to the first scheduling pool based on the grant size requirement of the first wireless device decreasing below the first threshold. In certain embodiments, determining module 910 may move the first wireless device from the second scheduling pool back to the first scheduling pool based on the probability of the first wireless device being scheduled in the first scheduling pool increasing above the second threshold. In certain embodiments, determining module 910 may move the first wireless device from the second scheduling pool back to the first scheduling pool based on the liming advance value of the first wireless device decreasing below the one or more threshold values.

As another example, in certain embodiments determining module 910 may determine one or more of a timing advance value of the one or more wireless devices; a quality of service requirement of the one or more wireless devices; a grant size requirement of the one or more wireless devices; a probability that the one or more wireless devices will be scheduled; and a deployment of the network node.

As another example, determining module 910 may obtain capability information for the one or more wireless devices. The capability information may indicate whether the one or more wireless devices support one or inure of the short TTI and the reduced processing time. In certain embodiments, determining module 910 may determine whether the one or more wireless devices support one or more of a short TTI and a reduced processing time based on the obtained capability information.

Determining module 910 in ay include or be included in one or more processors, such as processing circuitry 620 described above in relation to FIG. 6. Determining module 910 may include analog and/or digital circuitry configured to perform any of the functions of determining module 910 and/or processing circuitry 620 described above. The functions determining module 910 may, in certain embodiments, be performed in one or more distinct modules.

Communication module 920 may perform the transmission function of network node 115. Communication module 920 may transmit messages to one or more of wireless devices 110. Communication module 920 may include a transmitter and/or a transceiver, such as transceiver 610 described above in relation to FIG. 6. Communication module 920 may include circuitry configured to wirelessly transmit messages and/or signals. In particular embodiments, communication module 920 may receive messages and/or signals for transmission from determining module 910 or any other module. The functions apt communication module 920 may, in certain embodiments, be performed in one or more distinct modules.

Receiving module 930 may perform the receiving functions of network node 115. For example, receiving module 930 may obtain capability information for the first wireless device, the capability information indicating whether the first wireless device supports one or more of the short TTI and the reduced processing time. Receiving module 930 may receive any suitable information from a wireless device. Receiving module 930 may include a receiver and/or a transceiver, such as transceiver 610 described above in relation to FIG. 6. Receiving module 930 may include circuitry configured to wirelessly receive messages and/or signals. In particular embodiments, receiving module 930 may communicate received messages and/or signals to determining module 910 or any other suitable module. The functions of receiving module 930 may, in certain embodiments, be performed in one or inure distinct modules.

Determining module 910, communication module 920, and receiving module 930 may include any suitable configuration of hardware and/or software. Network node 115 may include additional modules beyond those shown in FIG. 9 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations or the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP 3$^{rd}$ Generation Partnership Project
AP Access Point
ASIC Application Specific Integrated Circuit
BS Base Station
BSC Base Station Controller
BTS Base Transceiver Station.
CD Compact Disk
CPE Customer Premises Equipment
CPU Central Processing Unit
D2D Device-to-device
DAS Distributed Antenna System
DCI Downlink Control Information
DL Downlink
DVD Digital Video Disk
eNB evolved Node B
E-SMLC Evolved Serving Mobile Location Center
L-UTRAN Evolved Universal Terrestrial Radio Access Network
FDD Frequency Division Duplex
FPGA Field Programmable Gate Array
IoT Internet of Things
IP Internet Protocol
LAN Local Area Network
LEE Laptop Embedded Equipment
LME Laptop Mounted Equipment
LTE Long Term Evolution
M2M Machine-to-Machine
MAC Medium Access Control
MAN Metropolitan Area Network
MCE Multi-cell/multicast Coordination Entity
MCS Modulation level and coding scheme
MDT Minimization of Drive Test
MME Mobility Management Entity
MSC Mobile. Switching Center
MSR Multi-standard Radio
MTC Machine-Type Communication
NAS Non-Access Stratum
NB-IoT Narrow band Internet of Things
NR New Radio
O&M Operations and Management
OSS Operations Support System
PSTN Public Switched Telephone Network
RACH Random Access Channel
RAM Random Access Memory
RAN Radio Access Network
RAT Radio Access Technology
RNC Radio Network Controller
ROM Read-Only. Memory
RRC Radio Resource Control
RRH Remote Radio Head
RRU Remote Radio Unit
SON Self-Organizing Network
TA Timing Advance
TDD Time Division Duplex
TTI Transmission Time Interval
UCI Uplink Control Information
UE User Equipment
UL Uplink
WAN Wide Area Network
WLAN Wireless Local Area Network

The invention claimed is:

1. A method in a network node, comprising:
   determining, for each of a plurality of wireless devices, whether one or more of a short transmission time interval (TTI) and a reduced processing time are supported;
   determining, for each of the plurality of wireless devices, whether a timing advance value is below one or more threshold values;
   assigning one or more wireless devices, determined to support one or more of the short TTI and the reduced processing time and determined to have a timing advance value below the one or more threshold values, to a first scheduling pool;

assigning one or more wireless devices, determined not to support one or more of the short TTI and the reduced processing time, to a second scheduling pool;

assigning one or more wireless devices, determined to support one or more of the short TTI and the reduced processing time and determined to have a timing advance value above a maximum allowed timing advance value for one or more of the short TTI and the reduced processing time, to the second scheduling pool;

moving a first wireless device assigned to the first scheduling pool to the second scheduling pool based on one or more criteria, the one or more criteria comprising a timing advance value of the first wireless device;

determining whether the timing advance value of the first wireless device has increased above the maximum allowed timing advance value for one or more of the short TTI and the reduced processing time; and upon determining that the timing advance value of the first wireless device has increased above the maximum allowed timing advance value for one or more of the short TTI and the reduced processing time, moving the first wireless device assigned to the first scheduling pool to the second scheduling pool.

2. The method of claim 1, comprising scheduling the plurality of wireless devices based on the assigned scheduling pool.

3. The method of claim 2, wherein scheduling the plurality of wireless devices based on the assigned scheduling pool comprises:

scheduling the one or more wireless devices assigned to the first scheduling pool with one or more of a short TTI and reduced processing time; and scheduling the one or more wireless devices assigned to the second scheduling pool with a legacy grant.

4. The method of claim 1, comprising:
moving a second wireless device assigned to the first scheduling pool to the second scheduling pool based on the one or more criteria.

5. The method of claim 4, wherein:
the one or more criteria comprise a deployment of the network node; and
the method comprises:
determining the deployment of the network node;
determining whether the deployment of the network node is compatible with reduced maximum timing advance operation; and
upon determining that the deployment of the network node is not compatible with reduced maximum timing advance operation, moving the second wireless device assigned to the first scheduling pool to the second scheduling pool.

6. The method of claim 5, wherein determining whether the deployment of the network node is compatible with reduced maximum timing advance operation comprises:
determining, based on a propagation delay induced by the deployment of the network node, whether the deployment of the network node is compatible with reduced maximum timing advance operation.

7. The method of claim 4, wherein moving the second wireless device assigned to the first scheduling pool to the second scheduling pool based on one or more criteria comprises at least one of:
moving the second wireless device assigned to the first scheduling pool to the second scheduling pool if the second wireless device has non-stringent latency requirements;

moving the second wireless device assigned to the first scheduling pool to the second scheduling pool if the second wireless device has a grant size requirement that is above a first threshold;

moving the second wireless device assigned to the first scheduling pool to the second scheduling pool if the second wireless device has a probability of being scheduled in the first scheduling pool that is below a second threshold; and moving the second wireless device assigned to the first scheduling pool to the second scheduling pool if a deployment of the network node is not compatible with reduced timing advance operation.

8. The method of claim 4, comprising:
moving the second wireless device from the second scheduling pool back to the first scheduling pool based on a change in network conditions.

9. The method of claim 8, wherein the change in network conditions comprises at least one of:
a decrease in a number of wireless devices in the first scheduling pool that can be scheduled with one or more of short TTI and reduced processing time;
a decrease in an amount of data in a buffer of one or more wireless devices in the first scheduling pool;
a grant size requirement of the second wireless device decreases below a first threshold;
a probability of the second wireless device being scheduled in the first scheduling pool increases above a second threshold; and
a timing advance value of the second wireless device decreases below the one or more threshold values.

10. The method of claim 4, wherein the one or more criteria comprise one or more of:
a timing advance value of the second wireless device;
a quality of service requirement of the second wireless device;
a grant size requirement of the second wireless device;
a probability that the second wireless device in the first scheduling pool will be scheduled; and
a deployment of the network node.

11. The method of claim 1, comprising:
determining one or more of:
a timing advance value of the one or more wireless devices;
a quality of service requirement of the one or more wireless devices;
a grant size requirement of the one or more wireless devices;
a probability that the one or more wireless devices will be scheduled; and
a deployment of the network node.

12. The method of claim 1, comprising:
obtaining capability information for the plurality of wireless devices, the capability information indicating whether the plurality of wireless devices support one or more of the short TTI and the reduced processing time; and
wherein the determination of whether one or more of a short TTI and a reduced processing time are supported is based on the obtained capability information.

13. A network node, comprising:
processing circuitry, the processing circuitry configured to:
determine, for each of a plurality of wireless devices, whether one or more of a short transmission time interval (TTI) and a reduced processing time are supported;

determine, for each of the plurality of wireless devices, whether a timing advance value is below one or more threshold values;

assign one or more wireless devices, determined to support one or more of the short TTI and the reduced processing time and determined to have a timing advance value below the one or more threshold values, to a first scheduling pool;

assign one or more wireless devices, determined not to support one or more of the short TTI and the reduced processing time, to a second scheduling pool; and assign one or more wireless devices, determined to support one or more of the short TTI and the reduced processing time and determined to have a timing advance value above a maximum allowed timing advance value for one or more of the short TTI and the reduced processing time, to the second scheduling pool;

move a first wireless device assigned to the first scheduling pool to the second scheduling pool based on one or more criteria, the one or more criteria comprising a timing advance value of the first wireless device;

determine whether the timing advance value of the first wireless device has increased above the maximum allowed timing advance value for one or more of the short TTI and the reduced processing time; and upon determining that the timing advance value of the first wireless device has increased above the maximum allowed timing advance value for one or more of the short TTI and the reduced processing time, move the first wireless device assigned to the first scheduling pool to the second scheduling pool.

14. The network node of claim 13, wherein the processing circuitry is configured to schedule the plurality of wireless devices based on the assigned scheduling pool.

15. The network node of claim 14, wherein the processing circuitry configured to schedule the plurality of wireless devices based on the assigned scheduling pool comprises processing circuitry configured to:

schedule the one or more wireless devices assigned to the first scheduling pool with one or more of a short TTI and reduced processing time; and schedule the one or more wireless devices assigned to the second scheduling pool with a legacy grant.

16. The network node of claim 13, wherein the processing circuitry is configured to:

move a second wireless device assigned to the first scheduling pool to the second scheduling pool based on the one or more criteria.

17. The network node of claim 16, wherein:

the one or more criteria comprise a deployment of the network node; and the processing circuitry is configured to:
   determine the deployment of the network node;
   determine whether the deployment of the network node is compatible with reduced maximum timing advance operation; and
   upon determining that the deployment of the network node is not compatible with reduced maximum timing advance operation, move the second wireless device assigned to the first scheduling pool to the second scheduling pool.

18. The network node of claim 17, wherein the processing circuitry is configured to:

determine whether the deployment of the network node is compatible with reduced maximum timing advance operation based on a propagation delay induced by the deployment of the network node.

* * * * *